(12) United States Patent
Islam et al.

(10) Patent No.: US 12,075,356 B2
(45) Date of Patent: Aug. 27, 2024

(54) CONTROL CHANNEL SIGNALING FOR USER EQUIPMENT (UE) POWER SAVING

(71) Applicant: Apple Inc., Cupertino, CA (US)

(72) Inventors: Toufiqul Islam, Cupertino, CA (US); Hong He, Cupertino, CA (US); Qiaoyang Ye, Cupertino, CA (US); Honglei Miao, Cupertino, CA (US); Dae Won Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 17/442,327

(22) PCT Filed: May 1, 2020

(86) PCT No.: PCT/US2020/031080
§ 371 (c)(1),
(2) Date: Sep. 23, 2021

(87) PCT Pub. No.: WO2020/223654
PCT Pub. Date: Nov. 5, 2020

(65) Prior Publication Data
US 2022/0159574 A1    May 19, 2022

Related U.S. Application Data

(60) Provisional application No. 62/841,766, filed on May 1, 2019.

(51) Int. Cl.
*H04W 52/02* (2009.01)
*H04W 76/28* (2018.01)

(52) U.S. Cl.
CPC ... *H04W 52/0229* (2013.01); *H04W 52/0216* (2013.01); *H04W 52/0219* (2013.01); *H04W 76/28* (2018.02)

(58) Field of Classification Search
CPC ............ H04W 52/0229; H04W 76/28; H04W 52/0216; H04W 52/0219
(Continued)

(56) References Cited

U.S. PATENT DOCUMENTS 9,872,252 B1    1/2018  Ang et al.
11,729,857 B2   8/2023  Islam et al.
(Continued)

FOREIGN PATENT DOCUMENTS

CN    103636264    3/2014
CN    109496452    3/2019
(Continued)

OTHER PUBLICATIONS

[No Author Listed], "3rd Generation Partnership Project; Technical Specification Group Radio Access Network; NR; Medium Access Control (MAC) protocol specification (Release 16)," TS 38.321, 141 pages.
(Continued)

*Primary Examiner* — Mark G. Pannell
(74) *Attorney, Agent, or Firm* — Fish & Richardson P.C.

(57) ABSTRACT

Systems, devices, and techniques for user equipment (UE) power control are described. A described technique includes receiving, by a UE, a discontinuous receiving (DRX) configuration from a base station; monitoring, by the UE on a physical downlink control channel (PDCCH), for downlink control information (DCI) messages outside of a DRX active time, the DCI messages being of a predetermined format that is configured to provide wake-up signaling; receiving, by the UE, a DCI message outside of the DRX active time, the DCI message being of the predetermined format; and determining, by the UE, whether to wake-up based on the received DCI message.

14 Claims, 22 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2016/0286603 A1 | 9/2016 | Vajapeyam et al. | |
| 2017/0251518 A1* | 8/2017 | Agiwal | H04W 76/28 |
| 2018/0332655 A1 | 11/2018 | Ang et al. | |
| 2019/0090299 A1 | 3/2019 | Ang et al. | |
| 2019/0254110 A1* | 8/2019 | He | H04L 5/0048 |
| 2019/0297577 A1* | 9/2019 | Lin | H04W 52/0219 |
| 2020/0037247 A1 | 1/2020 | Liao et al. | |
| 2020/0037396 A1* | 1/2020 | Islam | H04W 52/0229 |
| 2020/0092073 A1 | 3/2020 | Papasakellariou et al. | |
| 2020/0100179 A1* | 3/2020 | Zhou | H04W 52/0216 |
| 2020/0112919 A1* | 4/2020 | Nam | H04B 7/0617 |
| 2020/0150736 A1* | 5/2020 | Nam | G06F 1/3209 |
| 2020/0267655 A1* | 8/2020 | Awoniyi-Oteri | H04W 52/0216 |
| 2020/0344722 A1* | 10/2020 | He | H04W 4/46 |
| 2020/0351784 A1* | 11/2020 | Tsai | H04W 72/23 |
| 2021/0185614 A1* | 6/2021 | Zhou | H04L 5/0051 |
| 2021/0195521 A1 | 6/2021 | Muller et al. | |
| 2021/0203468 A1* | 7/2021 | Yi | H04W 72/0453 |
| 2021/0259044 A1 | 8/2021 | Islam et al. | |
| 2021/0314866 A1* | 10/2021 | Lee | H04W 52/0229 |
| 2021/0360621 A1* | 11/2021 | Jiang | H04W 52/0216 |
| 2021/0368438 A1 | 11/2021 | Li et al. | |
| 2021/0368447 A1* | 11/2021 | Kim | H04W 52/0235 |
| 2022/0191793 A1* | 6/2022 | Murray | H04W 72/23 |
| 2022/0201607 A1* | 6/2022 | Zhao | H04W 52/0229 |
| 2023/0389125 A1 | 11/2023 | Islam et al. | |

FOREIGN PATENT DOCUMENTS

| | | |
|---|---|---|
| KR | 10-2018-0020168 | 2/2018 |
| WO | WO 2015/018045 | 2/2015 |
| WO | WO 2018/132100 | 7/2018 |
| WO | WO 2018/175760 | 9/2018 |
| WO | WO 2018/203822 | 11/2018 |
| WO | WO 2018/208956 | 11/2018 |
| WO | WO 2019/030335 | 2/2019 |

OTHER PUBLICATIONS

Apple Inc., "Design of PDCCH-based Power Saving Signal and Channel," 3GPP TSG RAN WG1 #97, R1-1907345, Reno, USA, May 13-17, 2019, 12 pages.
Apple Inc., "PDCCH based power saving channel design for UE power saving," 3GPP TSG RAN WG1 #98b, R1-1970972, Chongqing, China, Oct. 14-18, 2019, 10 pages.
Apple Inc., "R16 UE power saving: PDCCH monitoring reduction," 3GPP TSG RAN Meeting #85, RP-192176, Newport Beach, CA, USA, Sep. 16-20, 2019, 4 pages.
Apple Inc., "View on PDCCH skipping," 3GPP RSG RAN Meeting #84, RP-191108, New Port Beach, US, Jun. 3-6, 2019, 7 pages.
CATT, "PDCCH based power saving signal/channel design," 3GPP TSG RAN WG1 #96bis, R1-1905368, Xi'an, China, Apr. 8-12, 2019, 8 pages.
International Preliminary Report on Patentability in International Appln. No. PCT/US2020/031080, dated Nov. 11, 2021, 18 pages.
International Search Report and Written Opinion in International Appln. No. PCT/US2020/031080, dated Sep. 8, 2020, 28 pages.
Invitation to Pay Additional Fees in International Appln. No. PCT/US2020/031080, dated Jul. 15, 2020, 23 pages.
Qualcomm Incorporated, "Triggering Adaptation of UE Power Consumption Characteristics," 3GPP TSG-RAN WG1 Meeting #94bis, R1-1811283, Chengdu, China, Oct. 8-12, 2018, 12 pages.
CATT, "New SID: Study on UE Wakeup Mechanism in NR," 3GPP TSG RAN Meeting #75, RP-170673 (revision of RP-170411), Dubrovnik, Croatia, Mar. 6-9, 2017, 4 pages.
Ericsson, "DRX with short on-Duration and Wake-up signaling," 3GPP TSG-RAN WG2#103, Tdoc R2-1811627 (Resubmission of R2-1810058), Gothenburg, Sweden, Aug. 20-24, 2018, 3 pages.
Ericsson, "Wake-up signal configurations and procedures for Nb-IoT," 3GPP TSG RAN WG1 Meeting #93, R1-1805855, Busan, Korea, May 20-24, 2018, 9 pages.
Qualcomm Incorporated, "Efficient monitoring of DL control channels," 3GPP TSG RAN WG1 Meeting #92bis, R1-1804914, Sanya, China, Apr. 16-20, 2018, 13 pages.

* cited by examiner

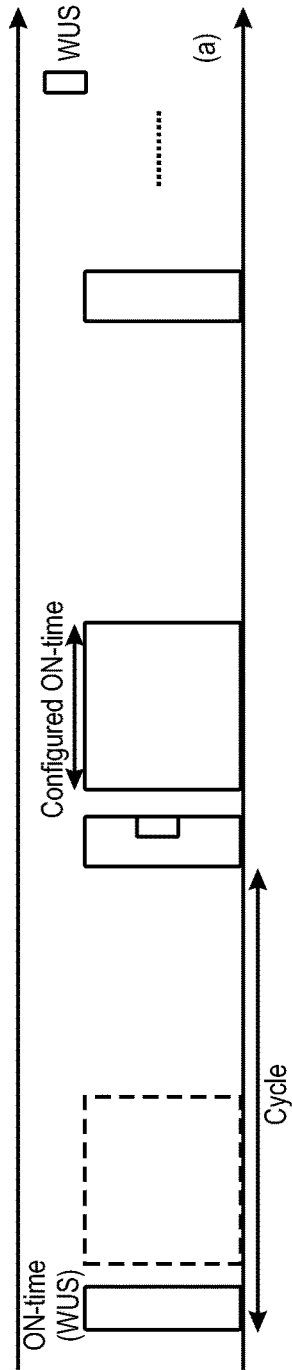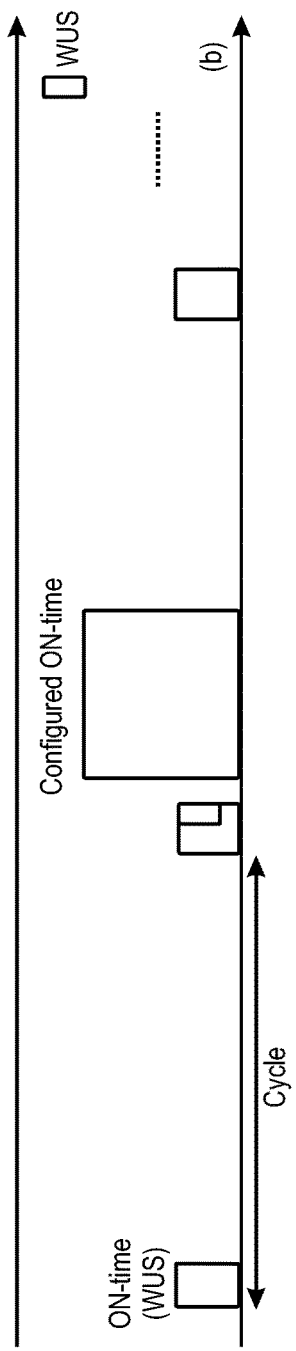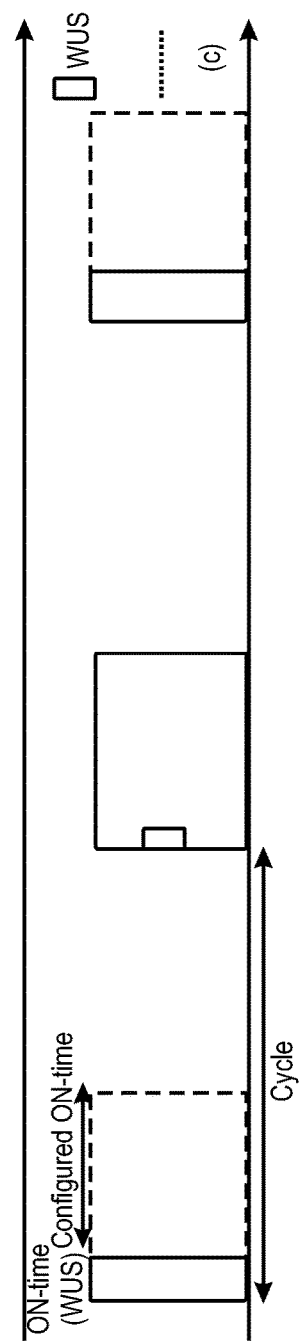

CONTROL CHANNEL SIGNALING FOR USER EQUIPMENT (UE) POWER SAVING

CROSS-REFERENCE TO RELATED APPLICATION

The present application is a U.S. National Phase application under 35 U.S.C. § 371 of International Patent Application No. PCT/US2020/031080, filed on May 1, 2020, which claims the benefit of the priority of U.S. Provisional Patent Application No. 62/841,766, entitled "CONTROL CHANNEL SIGNALING FOR USER EQUIPMENT (UE) POWER SAVING" and filed on May 1, 2020, the disclosures of each of which are incorporated herein by reference in their entirety.

TECHNICAL FIELD

This disclosure relates generally to wireless communication systems.

BACKGROUND

Base stations, such as a node of radio access network (RAN), can wirelessly communicate with wireless devices such as user equipment (UE). A downlink (DL) transmission refers to a communication from the base station to the wireless device. An uplink (UL) transmission refers to a communication from the wireless device to another device such as the base station. Base stations can transmit control signaling in order to control wireless devices that operate within their network.

SUMMARY

Systems, devices, and techniques for user equipment (UE) power control are described. A described technique includes receiving, by a UE, a discontinuous receiving (DRX) configuration from a base station; monitoring, by the UE on a physical downlink control channel (PDCCH), for downlink control information (DCI) messages outside of a DRX active time based on the DRX configuration, the DCI messages being of a predetermined DCI format that is configured to provide wake-up signaling; receiving, by the UE, a DCI message outside of the DRX active time, the DCI message being of the predetermined DCI format; and determining, by the UE, whether to wake-up based on the received DCI message. Other implementations include corresponding systems, apparatus, and computer programs to perform the actions of methods defined by instructions encoded on computer readable storage.

These and other implementations can include one or more of the following features. In some implementations, the received DCI message includes a wake-up indication which can be referred to as a wake-up signal (WUS). Implementations can include determining, based on the received DCI message, whether the UE is permitted to skip PDCCH monitoring for a predetermined number of occasions. In some implementations, the DCI message includes a field to activate or deactivate one or more cells. In some implementations, the received predetermined DCI format is a group-common DCI format. In some implementations, the UE is one of a plurality of UEs, and each of the plurality of UEs is configured to monitor for the group-common DCI format. In some implementations, the group-common DCI format comprises a UE-specific field that indicates whether the UE is to wake up.

Implementations can include remaining in a sleep state and skipping a predetermined number of DRX cycles, when the DCI message is received outside the DRX active time and indicates no wake-up. Implementations can include waking from the sleep state and transitioning to an active state, when the DCI message is received outside the DRX active time and indicates a wake-up. In some implementations, the group-common DCI format includes one or more UE-specific bits that map to one or more of: a wake-up indication, cross-slot scheduling configuration, trigger for a reference signal, indication of an uplink resource for channel state report, activation of a cell, deactivation of a cell, activation of a carrier, deactivation of a carrier, trigger for BWP switching, PDCCH decoding information, DRX configuration, or an indication of a number of DRX cycles to be skipped or active.

Implementations can include monitoring for additional DCI messages during the DRX active time, the additional DCI messages being of a predetermined format that is configured to provide go-to-sleep (GTS) signaling and includes one or more UE-specific bits that map to one or more of: a go-to-sleep indication to control whether the UE skips PDCCH monitoring or transitions from active time to outside active time, a number of PDCCH monitoring occasions to be skipped, a PDCCH skipping duration, activation of a cell, deactivation of a cell, activation of a carrier, or deactivation of a carrier.

A UE can include one or more processors, a transceiver, and a memory storing instructions that, when executed by the one or more processors, cause the one or more processors to perform operations. The operations can include receiving, via the transceiver, a DRX configuration from a base station; monitoring, via the transceiver on a PDCCH, for a DCI message outside of a DRX active time based on the DRX configuration, the DCI message being of a predetermined DCI format that is configured to provide wake-up signaling; receiving, by the transceiver, the DCI message outside of the DRX active time; and determining whether to wake-up based on the received DCI message.

Communication circuitry can include circuitry configured to receive a DRX configuration from a base station; and monitor, on a PDCCH, for a DCI message outside of a DRX active time based on the DRX configuration, the DCI message being of a predetermined DCI format that is configured to provide wake-up signaling; and receive the DCI message outside of the DRX active time; and circuitry configured to determine whether to cause a wake-up based on the DCI message. The DCI message can include a wake-up indication. Communication circuitry can include circuitry to determine, based on the DCI message, whether the UE is permitted to skip PDCCH monitoring for a predetermined number of occasions.

The details of one or more implementations are set forth in the accompanying drawings and the description below. Other features and advantages will be apparent from the description and drawings, and from the claims.

BRIEF DESCRIPTION OF DRAWINGS

FIGS. 12A, 12B, 12C, and 12D illustrate different examples of wake up signaling.

Like reference symbols in the various drawings indicate like elements.

DETAILED DESCRIPTION

Figure 1:
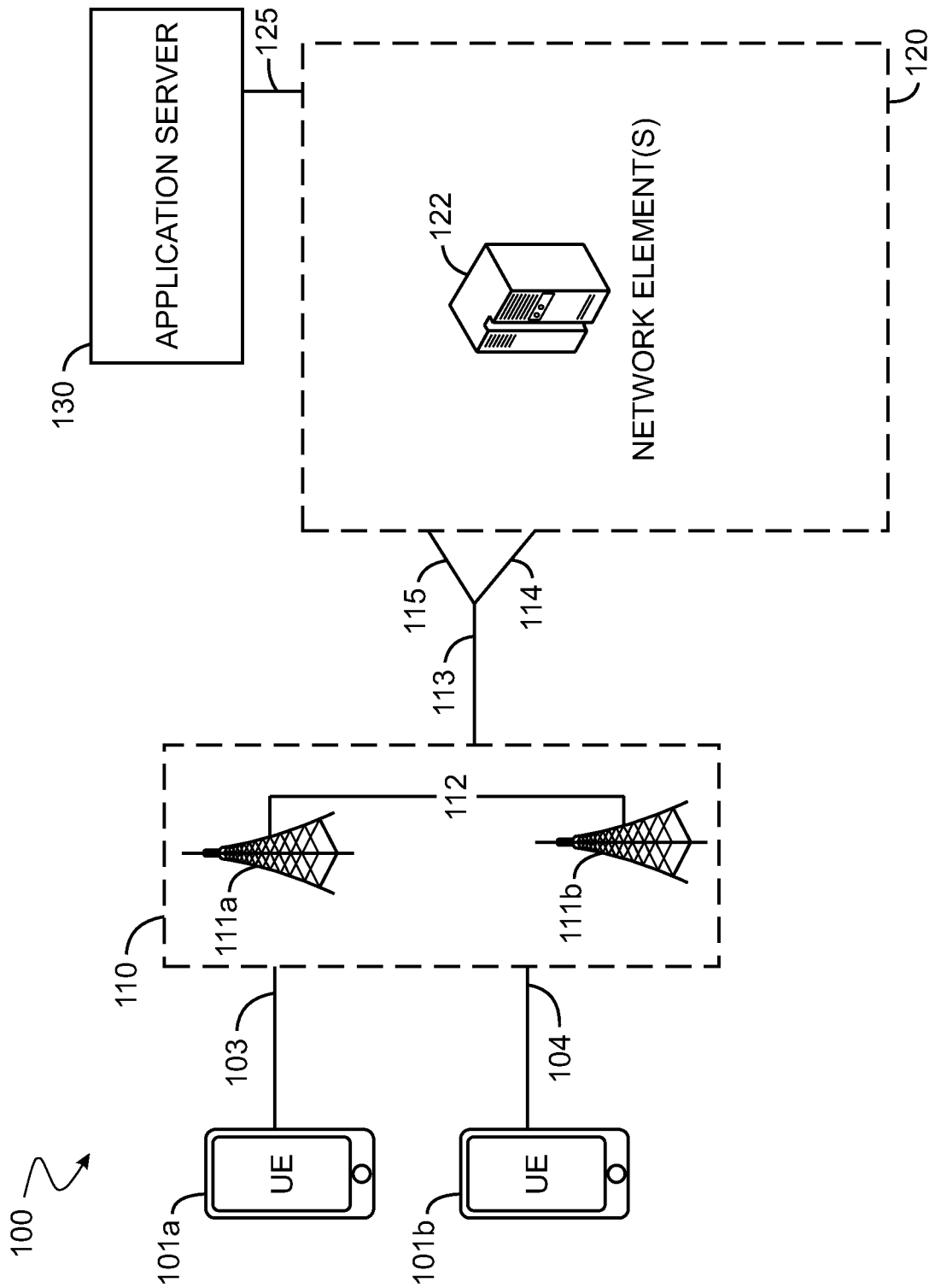
FIG. 1 illustrates an example of a wireless communication system.

FIG. 1 illustrates an example of a wireless communication system 100. For purposes of convenience and without limitation, the example system 100 is described in the context of the LTE and 5G NR communication standards as defined by the Third Generation Partnership Project (3GPP) technical specifications. However, other types of communication standards are possible.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (MT) devices, or combinations of them, among others.

In some implementations, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with RAN 110. The RAN 110 can include one or more RAN nodes 111a and 111b (collectively referred to as "RAN nodes 111" or "RAN node 111"). In some implementations, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols.

The RAN 110 can include one or more RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, road side units (RSUs), and the like, and can include ground stations (e.g., terrestrial access points) or satellite stations providing coverage within a geographic area (e.g., a cell), among others. As used herein, the term "NG RAN node" may refer to a RAN node 111 that operates in a 5G NR system 100 (for example, a gNB), and the term "E-UTRAN node" may refer to a RAN node 111 that operates in an LTE or 4G system 100 (e.g., an eNB). In some implementations, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

The RAN nodes 111 and the UEs 101 can be configured for multiple-input and multiple-output (MIMO) communications, including single or multi-beam communications. For example, a UE 101 can receive transmissions from one RAN node 111 at a time or from multiple RAN nodes 111 at the same time. The RAN nodes 111 and the UEs 101 can use beamforming for the UL, DL, or both. For example, one or more RAN nodes 111 can transmit (Tx) a beam towards a UE 101, and the UE 101 can receive data via one or more receive (Rx) beams at the same time. In some implementations, each of the RAN nodes 111 can be configured as a transmission and reception point (TRP). The RAN 110 can provide high-layer signaling for configuring beamforming such as by providing transmission configuration indication (TCI) state configuration information.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some implementations, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can comprise a plurality of orthogonal subcarriers.

In some implementations, a downlink resource grid can be used for downlink transmissions from any of the RAN nodes 111 to the UEs 101, while uplink transmissions can utilize similar techniques. The grid can be a frequency grid or a time-frequency grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid can include a number of resource blocks, which describe the mapping of certain physical channels to resource elements. A resource block (RB) can include a collection of resource elements; in the frequency domain, this may represent the smallest quantity of resources that currently can be allocated. Physical downlink and uplink channels can be conveyed using such resource blocks. In some cases, a RB can be referred to as a physical resource block (PRB).

The RAN nodes 111 can transmit to the UEs 101 over one or more DL channels. Various examples of DL communication channels include a physical broadcast channel (PBCH), physical downlink control channel (PDCCH), and physical downlink shared channel (PDSCH). The PDSCH can carry user data and higher-layer signaling to the UEs 101. Other types of downlink channels are possible. The UEs 101 can transmit to the RAN nodes 111 over one or more UL channels. Various examples of UL communication channels include physical uplink shared channel (PUSCH), physical uplink control channel (PUCCH), and physical random access channel (PRACH). Other types of uplink channels are possible. Devices such as the RAN nodes 111 and the UEs 101 can transmit reference signals. Examples of reference signals include a sounding reference signal (SRS), channel state information reference signal (CSI-RS), demodulation reference signal (DMRS or DM-RS), and phase tracking reference signal (PTRS). Other types of reference signals are possible.

A channel such as PDCCH can convey scheduling information of different types for one or more downlink and uplink channels. Scheduling information can include downlink resource scheduling, uplink power control instructions, uplink resource grants, and indications for paging or system information. The RAN nodes 111 can transmit one or more downlink control information (DCI) messages on the PDCCH to provide scheduling information, such as allocations of one or more PRBs. In some implementations, a DCI message transports control information such as requests for aperiodic CQI reports, UL power control commands for a channel, and a notification for a group of UEs 101 of a slot format. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101 or a group of UEs. In some implementations, the PDCCH carries information about the transport format and resource allocations related to the PDSCH channel, among other things. It may also inform the UEs 101 about the transport format, resource allocation, and hybrid automatic repeat request (HARQ) information for providing HARQ feedback on an uplink channel based on a PDSCH reception.

In some implementations, the PDCCH uses control channel elements (CCEs) to convey the control information. Before being mapped to resource elements, the PDCCH complex-valued symbols may first be organized into quadruplets, which may then be permuted using a sub-block interleaver for rate matching. In some implementations, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of DCI and the channel condition. In some implementations, there can be four or more different PDCCH formats defined with different numbers of CCEs (e.g., aggregation level, L=1, 2, 4, or 8).

Downlink and uplink transmissions can occur in one or more component carriers (CCs). One or more bandwidth part (BWP) configurations for each component carrier can be configured. In some implementations, a DL BWP includes at least one control resource set (CORESET). In some implementations, a CORESET includes one or more PRBs in a frequency domain, and one or more OFDM symbols in a time domain. In some implementations, channels such as PDCCH can be transmitted via one or more CORESETs, with each CORESET corresponding to a set of time-frequency resources. CORESET information can be provided to a UE 101, and the UE 101 can monitor time-frequency resources associated with one or more CORESETs to receive a PDCCH transmission.

Figure 2:
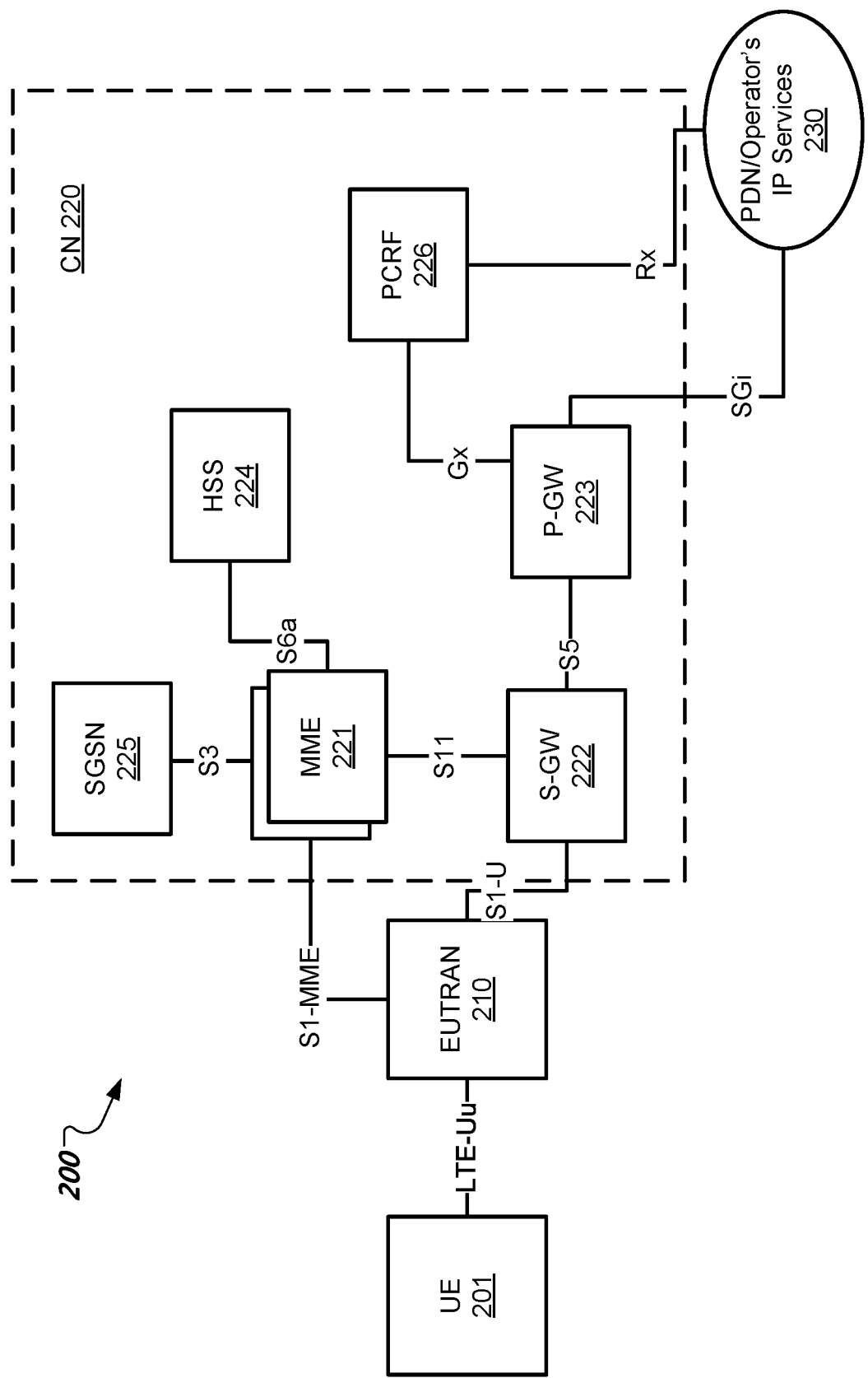
FIG. 2 illustrates an example architecture of a system including a core network.

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101: information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
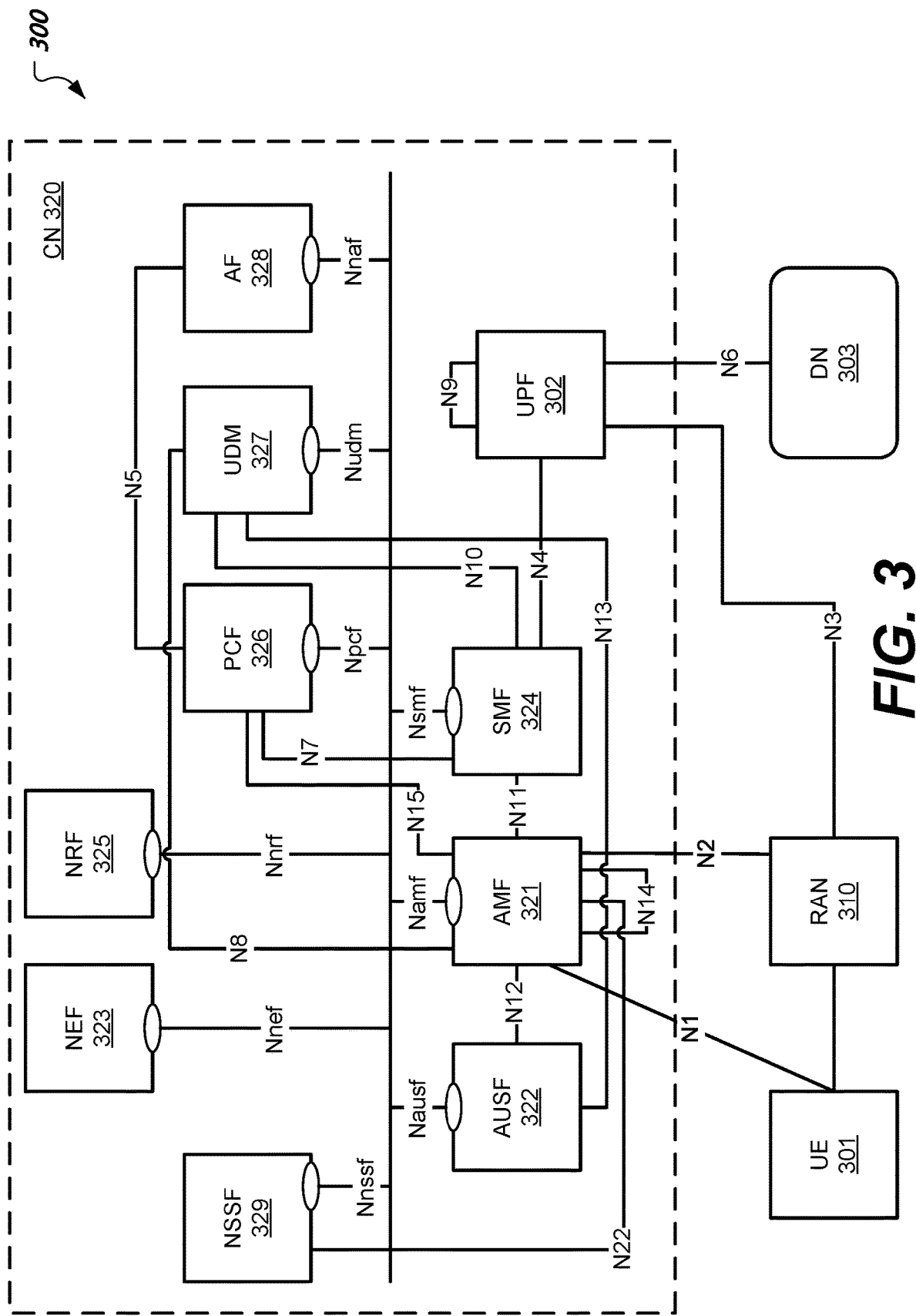
FIG. 3 illustrates another example architecture of a system including a core network.

In some implementations, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP or XnAP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

An application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120. The application server 130 can use an IP communications interface 125 to communicate with one or more network elements 122.

In some implementations, the CN 120 may be a 5G core network (referred to as "5GC 120" or "5G core network 120"), and the RAN 110 may be connected with the CN 120 using a next generation interface 113. In some implementations, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5G core network are discussed in more detail with regard to FIG. 3.

In some implementations, the CN 120 may be an EPC (referred to as "EPC 120" or the like), and the RAN 110 may be connected with the CN 120 using an S1 interface 113. In some implementations, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

In some implementations, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some implementations, an individual RAN node 111 may represent individual gNB distributed units (DUs) that are connected to a gNB central unit (CU) using individual F1 interfaces (not shown in FIG. 1). In some implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

FIG. 2 illustrates an example architecture of a system 200 including a first CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 can include MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 may include an EMM sublayer, and a mobility management context may be established in the UE 201 and the MME 221 when an attach procedure is successfully completed. The mobility management context may be a data structure or database object that stores mobility management-related information of the UE 201. The MMEs 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network, among other functions. The S3 reference point between the MMEs 221 and the SGSN 225 may enable user and bearer information exchange for inter-3GPP access network mobility in idle or active states, or both.

The HSS 224 may include a database for network users, including subscription-related information to support the network entities' handling of communication sessions. The EPC 220 may include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP communications interface 125 (see, e.g., FIG. 1). In some implementations, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a second CN 320. The system 300 is shown to include a UE 301, which may be the same or similar to the UEs 101 and UE 201 discussed previously: a RAN 310, which may be the same or similar to the RAN 110 and RAN 210 discussed previously, and which may include RAN nodes 111 discussed previously; and a data network (DN) 303, which may be, for example, operator services, Internet access or 3rd party services; and a 5GC 320. The 5GC 320 may include an authentication server function (AUSF) 322; an access and mobility management function (AMF) 321; a session management function (SMF) 324; a network exposure function (NEF) 323; a policy control function (PCF) 326: a network repository function (NRF) 325; a unified data management (UDM) function 327; an AF 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 using a N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent pro10 for routing SM messages. AMF 321 may also provide transport for SMS messages between UE 301 and an SMSF (not shown in FIG. 3). AMF 321 may act as security anchor function (SEAF), which may include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which may include or be a N2 reference point between the RAN 310 and the AMF 321. In some implementations, the AMF 321 may be a termination point of NAS (N1) signaling and perform NAS ciphering and integrity protection.

AMF 321 may also support NAS signaling with a UE 301 over a N3 inter-working function (IWF) interface (referred to as the "N3IWF"). The N3IWF may be used to provide access to untrusted entities. The N3IWF may be a termination point for the N2 interface between the RAN 310 and the AMF 321 for the control plane, and may be a termination point for the N3 reference point between the RAN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N14 reference point between two AMFs 321 and a N17 reference point between the AMF 321 and a 5G equipment identity registry (EIR) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM- REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a 5GC mobility management (MM) context that may be the same or similar to the (E)MM context discussed previously. In some implementations, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. In some implementations, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be RAN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a RAN 310 signaling connection (e.g., N2 and/or N3 connections) for the UE 301. Establishment of a N2 connection between the RAN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the RAN 310 and the AMF 321 is released.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to L1 system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to L1 system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some implementations, the NEF 323 may authenticate, authorize, and/or throttle the AFs. The NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which may include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 may include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM front end, which is in charge of processing credentials, location management, subscription management and so on. Several different front ends may serve the same user in different transactions. The UDM front end accesses subscription information stored in the UDR and performs authentication credential processing, user identification handling, access authorization, registration/mobility management, and subscription management. The UDR may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed single network slice selection assistance information (S-NSSAI), if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 may include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

In some implementations, there may be additional or alternative reference points or service-based interfaces, or both, between the network function services in the network functions. However, these interfaces and reference points have been omitted from FIG. 3 for clarity. In one example, the CN 320 may include a Nx interface, which is an inter-CN interface between the MME (e.g., MME 221) and the AMF 321 in order to enable interworking between CN 320 and CN 220. Other example interfaces or reference points may include a N5g-EIR service-based interface exhibited by a 5G-EIR, a N27 reference point between the NRF in the visited network and the NRF in the home network, or a N31 reference point between the NSSF in the visited network and the NSSF in the home network, among others.

In some implementations, the components of the CN 220 may be implemented in one physical node or separate physical nodes and may include components to read and execute instructions from a machine-readable or computer-readable medium (e.g., a non-transitory machine-readable storage medium). In some implementations, the components of CN 320 may be implemented in a same or similar manner as discussed herein with regard to the components of CN 220. In some implementations, NFV is utilized to virtualize any or all of the above-described network node functions using executable instructions stored in one or more computer-readable storage mediums, as described in further detail below. A logical instantiation of the CN 220 may be referred to as a network slice, and individual logical instantiations of the CN 220 may provide specific network capabilities and network characteristics. A logical instantiation of a portion of the CN 220 may be referred to as a network sub-slice, which can include the P-GW 223 and the PCRF 226.

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice may include a RAN part and a CN part. The support of network slicing relies on the principle that traffic for different slices is handled by different PDU sessions. The network can realize the different network slices by scheduling or by providing different L1/L2 configurations, or both. The UE 301 provides assistance information for network slice selection in an appropriate RRC message if it has been provided by NAS. While the network can support large number of slices, the UE need not support more than 8 slices simultaneously in some implementations.

A network slice may include the CN 320 control plane and user plane NFs, NG-RANs 310 in a serving PLMN, and a N3IWF functions in the serving PLMN. Individual network slices may have different S-NSSAI or different SSTs, or both. NSSAI includes one or more S-NSSAIs, and each network slice is uniquely identified by an S-NSSAI. Network slices may differ for supported features and network functions optimizations. In some implementations, multiple network slice instances may deliver the same services or features but for different groups of UEs 301 (e.g., enterprise users). For example, individual network slices may deliver different committed service(s) or may be dedicated to a particular customer or enterprise, or both. In this example, each network slice may have different S-NSSAIs with the same SST but with different slice differentiators. Additionally, a single UE may be served with one or more network slice instances simultaneously using a 5G AN, and the UE may be associated with eight different S-NSSAIs. Moreover, an AMF 321 instance serving an individual UE 301 may belong to each of the network slice instances serving that UE.

Network slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional or local policies based on awareness of a particular slice that the UE 301 is requesting to access. During the initial context setup, the NG-RAN 310 is informed of the slice for which resources are being requested.

Figure 4:
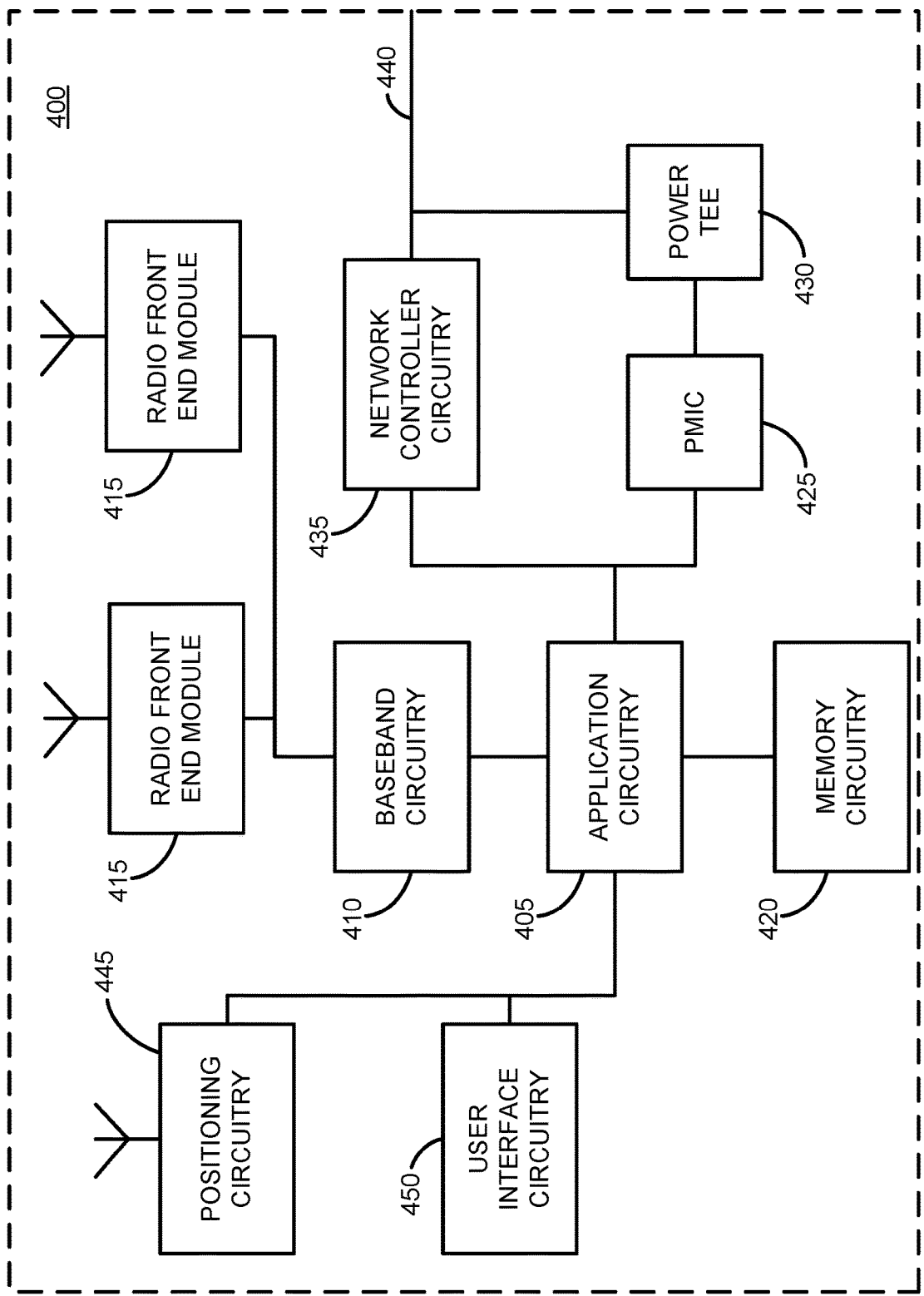
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 shown and described previously, an application server 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some implementations, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for GRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD), MultiMediaCard (MMC), Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some implementations, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more complex instruction set computing (CISC) processors, one or more digital signal processors (DSP), one or more FPGAs, one or more PLDs, one or more ASICs, one or more microprocessors or controllers, or combinations of them, among others. In some implementations, the application circuitry 405 may include, or may be, a special-purpose processor or controller configured to carry out the various techniques described here. In some implementations, the system 400 may not utilize application circuitry 405, and instead may include a special-purpose processor or controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) or deep learning (DL) accelerators, or both. In some implementations, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 may include logic blocks or logic fabric, and other interconnected resources that may be programmed to perform various functions, such as the procedures, methods, functions described herein. In some implementations, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 415, which incorporates both mmWave antennas and sub-mmWave. The baseband circuitry 410 may be implemented, for example, as a solder-down substrate including one or more integrated circuits, a single packaged integrated circuit soldered to a main circuit board or a multi-chip module containing two or more integrated circuits.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

Figure 5:
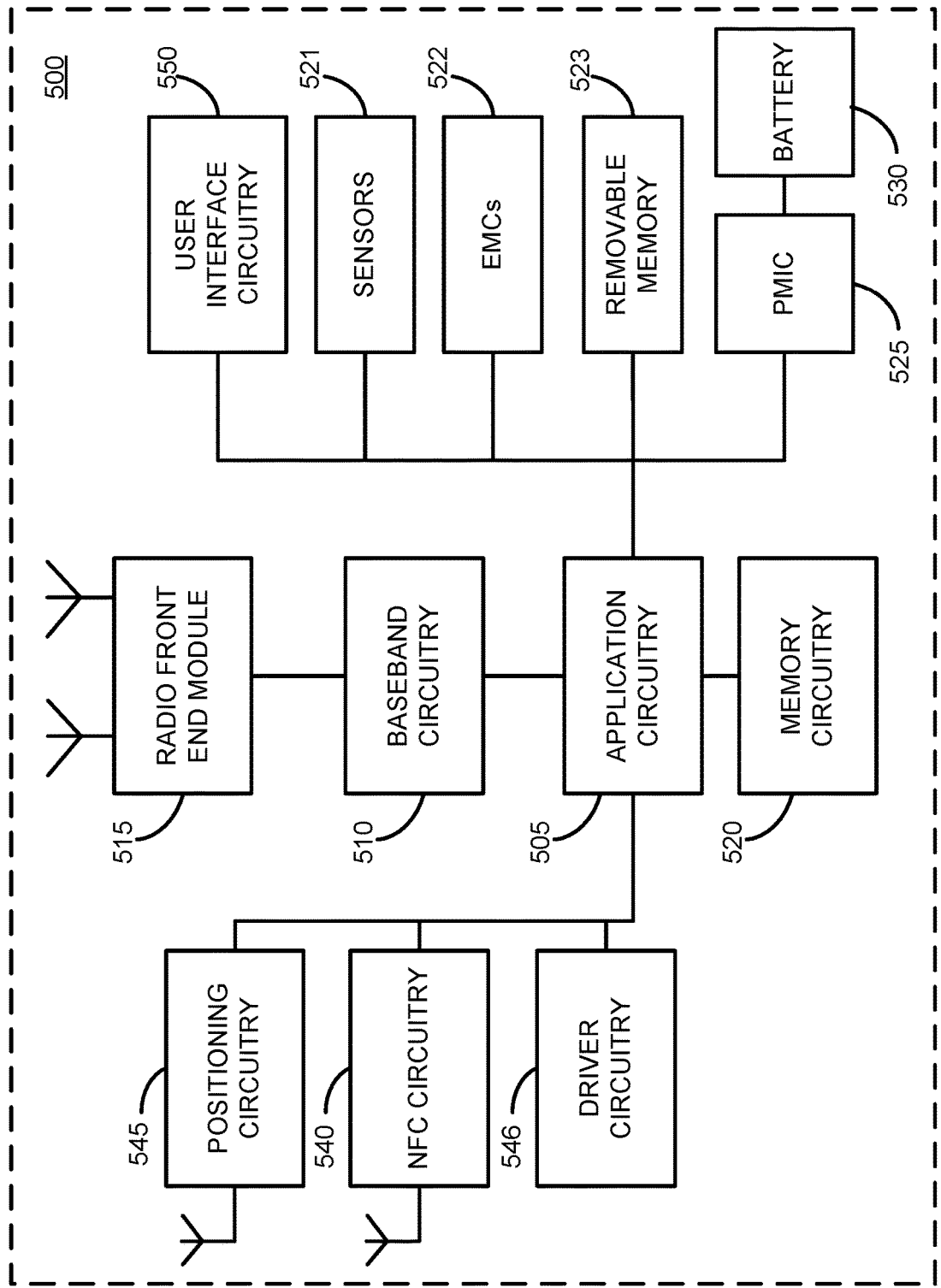
FIG. 5 illustrates an example of a platform or device.

FIG. 5 illustrates an example of a platform 500 (or "device 500"). In some implementations, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some implementations, the platform 500 may include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory or storage to enable various applications or operating systems to run on the system 500. In some implementations, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 405 may include, or may be, a special-purpose processor/controller to carry out the techniques described herein. In some implementations, the application circuitry 505 may be a part of a system on a chip (SoC) in which the application circuitry 505 and other components are formed into a single integrated circuit, or a single package.

In some implementations, the application circuitry 505 may include circuitry such as, but not limited to, one or more a field-programmable devices (FPDs) such as FPGAs, PLDs such as CPLDs, HCPLDs; ASICs such as structured ASICs; PSoCs, or combinations of them, among others. In some implementations, the application circuitry 505 may include logic blocks or logic fabric, and other interconnected resources that may be programmed to perform various functions, such as the procedures, methods, functions described herein. In some implementations, the application circuitry 505 may include memory cells e.g., EPROM, EEPROM, flash memory, static memory such as SRAM or anti-fuses, used to store logic blocks, logic fabric, data, or other data in LUTs and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 can include a millimeter wave (mmWave) RFEM and one or more sub-mmWave RFICs. In some implementations, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 515, which incorporates both mmWave antennas and sub-mmWave. In some implementations, the RFEMs 515, the baseband circuitry 510, or both are included in a transceiver of the platform 500.

The memory circuitry 520 may include any number and type of memory devices used to provide for a given amount of system memory. As examples, the memory circuitry 520 may include one or more of volatile memory, such as RAM, DRAM, or SDRAM, and NVM, such as high-speed electrically erasable memory (commonly referred to as Flash memory), PRAM, or MRAM, or combinations of them, among others. In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state drive (SSD), hard disk drive (HDD), a micro HDD, resistance change memories, phase change memories, holographic memories, or chemical memories, among others.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others. The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data)

about the detected events to one or more other devices, modules, or subsystems. Examples of such sensors include inertial measurement units (IMUs) such as accelerometers, gyroscopes, or magnetometers: microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some implementations, the platform 500 is configured to operate one or more EMCs 522 based on one or more captured events, instructions, or control signals received from a service provider or clients, or both.

In some implementations, the interface circuitry may connect the platform 500 with positioning circuitry 545. The positioning circuitry 545 includes circuitry to receive and decode signals transmitted or broadcasted by a positioning network of a GNSS. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 545 may include a Micro-PNT IC that uses a master timing clock to perform position tracking or estimation without GNSS assistance. The positioning circuitry 545 may also be part of, or interact with, the baseband circuitry 510 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some implementations, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some implementations, the PMIC 525 may control, or otherwise be part of, various power saving mechanisms of the platform 500. For example, if the platform 500 is in an RRC_CONNECTED state, where it is still connected to the RAN node as it expects to receive traffic shortly, then it may enter a state known as a DRX state after a period of inactivity. During this state, the platform 500 may power down for brief intervals of time and thus save power. If there is no data traffic activity for an extended period of time, then the platform 500 may transition off to an RRC_IDLE state, where it disconnects from the network and does not perform operations such as channel quality feedback or handover. This can allow the platform 500 to enter a very low power state, where it periodically wakes up to listen to the network and then powers down again. In some implementations, the platform 500 may not receive data in the RRC_IDLE state and instead must transition back to RRC_CONNECTED state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some implementations the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Crystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some implementations, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Figure 6:
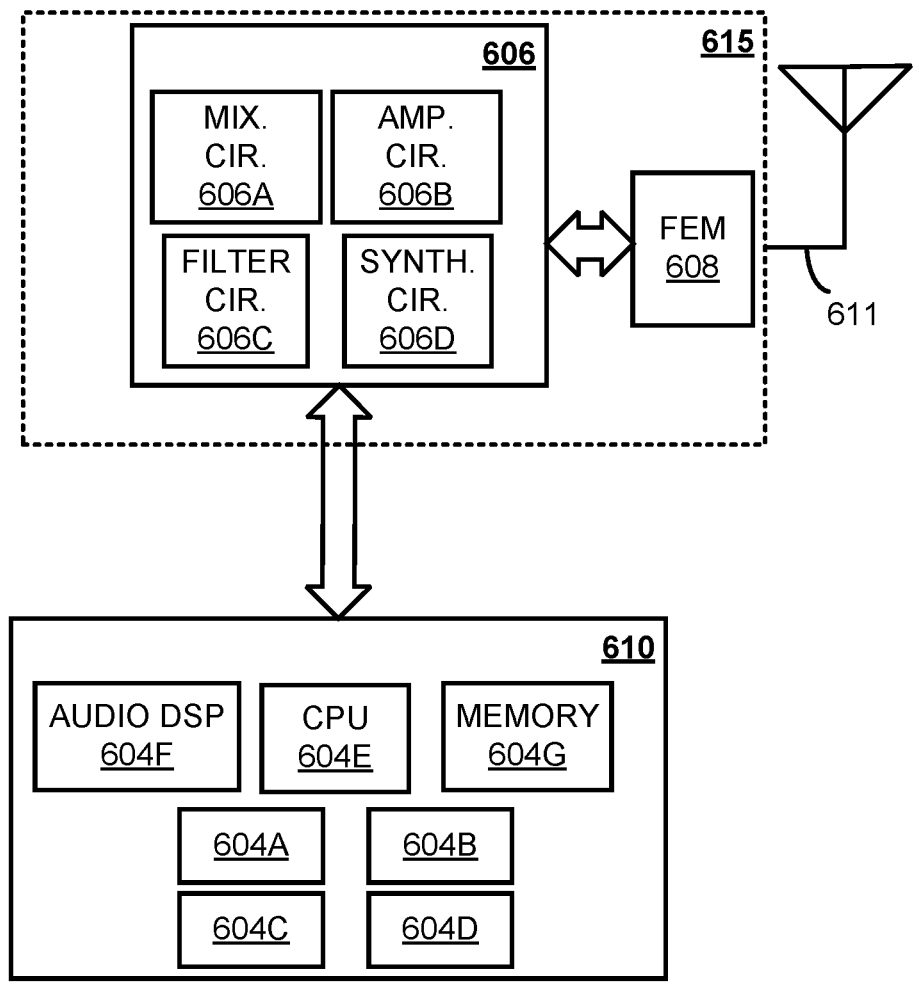
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 may include Radio Frequency (RF) circuitry 606, front-end module (FEM) circuitry 608, and antenna array 611 coupled together. In some implementations, the RFEMs 615, the baseband circuitry 610, or both are included in a transceiver.

The baseband circuitry 610 includes circuitry configured to carry out various radio or network protocol and control functions that enable communication with one or more radio networks using the RF circuitry 606. The radio control functions may include, but are not limited to, signal modulation and demodulation, encoding and decoding, and radio frequency shifting. In some implementations, modulation and demodulation circuitry of the baseband circuitry 610 may include Fast-Fourier Transform (FFT), precoding, or constellation mapping and demapping functionality. In some implementations, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some implementations, some or all of the functionality of baseband processors 604A-D may be included in modules stored in the memory 604G and executed using one or more processors such as a Central Processing Unit (CPU) 604E. In some implementations, some or all of the functionality of baseband processors 604A-D may be provided as hardware accelerators (e.g., FPGAs or ASICs) loaded with the appropriate bit streams or logic blocks stored in respective memory cells. In some implementations, the memory 604G may store program code of a real-time OS (RTOS) which, when executed by the CPU 604E (or other processor), is to cause the CPU 604E (or other processor) to manage resources of the baseband circuitry 610, schedule tasks, or carry out other operations. In some implementations, the baseband circuitry 610 includes one or more audio digital signal processors (DSP) 604F. An audio DSP 604F can include elements for compression and decompression and echo cancellation and may include other suitable processing elements in some implementations.

In some implementations, each of the processors 604A-604E includes respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 5); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi components, and/or the like); and a power management interface to send and receive power or control signals to and from the PMIC 525.

In some implementations (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some implementations, the baseband circuitry 610 may include protocol processing circuitry with one or more instances of control circuitry (not shown) to provide control functions for the digital baseband circuitry or radio frequency circuitry (e.g., the radio front end modules 615).

In some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In some implementations, the PHY layer functions include the aforementioned radio control functions. In some implementations, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some implementations, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some implementations, the components of the baseband circuitry 610 may be suitably combined in a single chip or chipset, or disposed on a same circuit board. In some implementations, some or all of the constituent components of the baseband circuitry 610 and RF circuitry 606 may be implemented together such as, for example, a system on a chip (SoC) or System-in-Package (SiP). In some implementations, some or all of the constituent components of the baseband circuitry 610 may be implemented as a separate SoC that is communicatively coupled with and RF circuitry 606 (or multiple instances of RF circuitry 606). In some implementations, some or all of the constituent components of the baseband circuitry 610 and the application circuitry 405, 505 may be implemented together as individual SoCs mounted to a same circuit board (e.g., a "multi-chip package").

In some implementations, the baseband circuitry 610 may provide for communication compatible with one or more radio technologies. The RF circuitry 606 may enable communication with wireless networks using modulated electromagnetic radiation through a non-solid medium. In some implementations, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some implementations, the transmit signal path of the RF circuitry 606 may include filter circuitry 606c and mixer circuitry 606a. The RF circuitry 606 also includes synthesizer circuitry 606d for synthesizing a frequency for use by the mixer circuitry 606a of the receive signal path and the transmit signal path. In some implementations, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some implementations, the output baseband signals may be zero-frequency baseband signals, although this is not a requirement. In some implementations, the mixer circuitry 606a of the receive signal path can include passive mixers.

In some implementations, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some implementations, the mixer circuitry 606a of the receive signal path and the mixer circuitry 606a of the transmit signal path may include two or more mixers and may be arranged for quadrature downconversion and upconversion, respectively. In some implementations, the mixer circuitry 606a of the receive signal path and the mixer circuitry 606a of the transmit signal path may include two or more mixers and may be arranged for image rejection (e.g., Hartley image rejection). In some implementations, the mixer circuitry 606a of the receive signal path and the mixer circuitry 606a of the transmit signal path may be arranged for direct downconversion and direct upconversion, respectively. In some implementations, the mixer circuitry 606a of the receive signal path and the mixer circuitry 606*a* of the transmit signal path may be configured for super-heterodyne operation.

In some implementations, the output baseband signals and the input baseband signals may be analog baseband signals. In some implementations, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606. In some dual-mode examples, a separate radio IC circuitry may be provided for processing signals for each spectrum, although the techniques described here are not limited in this respect.

In some implementations, the synthesizer circuitry 606*d* may be a fractional-N synthesizer or a fractional N/N+1 synthesizer, although other types of frequency synthesizers may be used. For example, synthesizer circuitry 606*d* may be a delta-sigma synthesizer, a frequency multiplier, or a synthesizer comprising a phase-locked loop with a frequency divider. The synthesizer circuitry 606*d* may be configured to synthesize an output frequency for use by the mixer circuitry 606*a* of the RF circuitry 606 based on a frequency input and a divider control input. In some implementations, the synthesizer circuitry 606*d* may be a fractional N/N+1 synthesizer. In some implementations, frequency input may be provided by a voltage controlled oscillator (VCO), although that is not a requirement. Divider control input may be provided by either the baseband circuitry 610 or the application circuitry 405/505 depending on the desired output frequency. In some implementations, a divider control input (e.g., N) may be determined from a look-up table based on a channel indicated by the application circuitry 405, 505.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some implementations, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 can include microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 can include a RRC layer, described in further detail below. As referred to herein, Layer 2 can include a MAC layer, an RLC layer, and a PDCP layer, described in further detail below. As referred to herein, Layer 1 (L1) can include a PHY layer of a UE/RAN node, described in further detail below.

Figure 7:
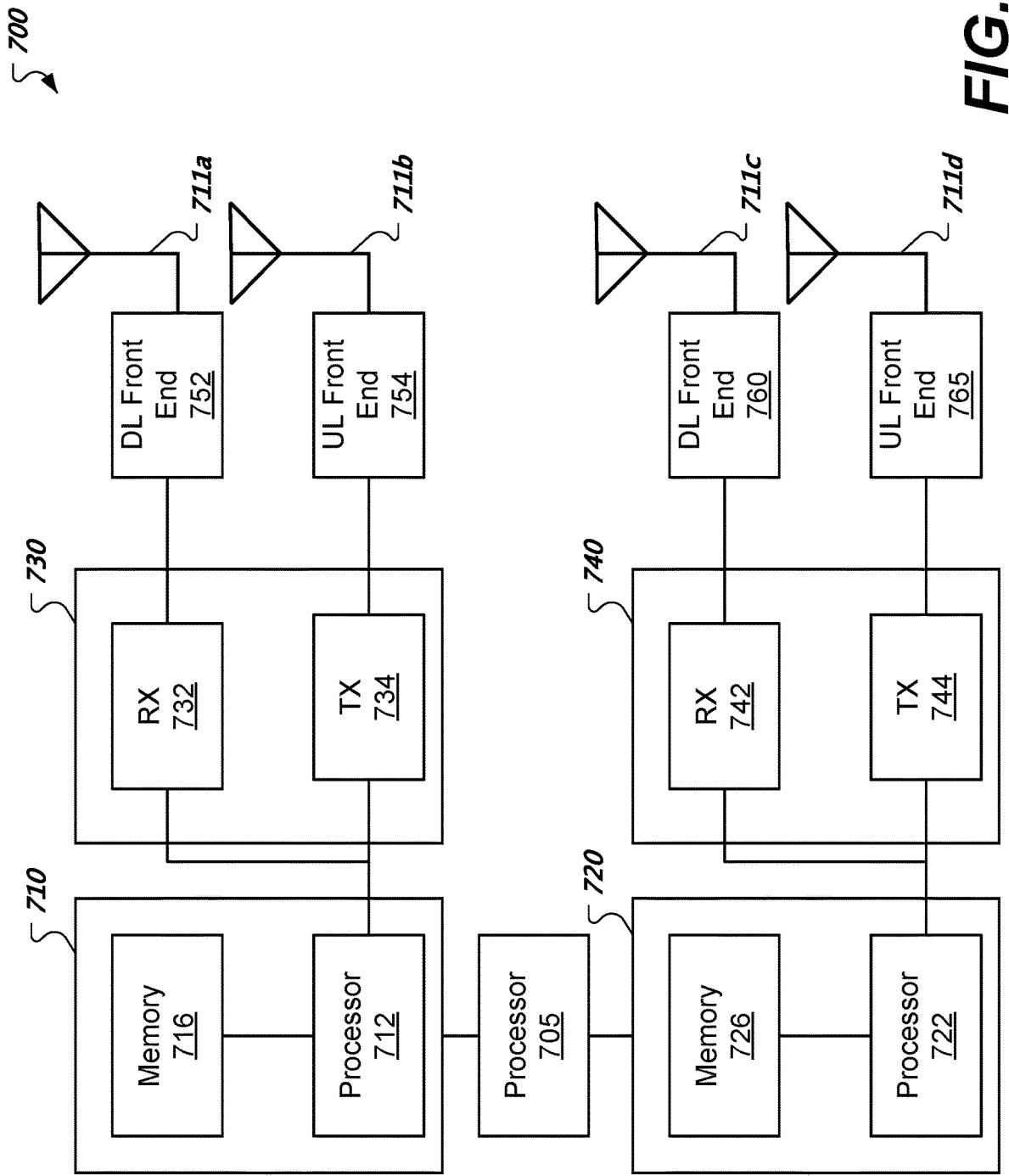
FIG. 7 illustrates example components of cellular communication circuitry.

FIG. 7 illustrates example components of communication circuitry 700. In some implementations, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 711*a*, 711*b*, 711*c*, and 711*d*. In some implementations, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR. In some implementations, a processor 705, such as an application processor can interface with the modems 710, 720.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 may include circuitry for transmitting and receiving radio signals. For example, the RF front end 730 includes RX circuitry 732 and TX circuitry 734. In some implementations, the receive circuitry 732 is in communication with a DL front end 752, which may include circuitry for receiving radio signals from one or more antennas 711*a*. The transmit circuitry 734 is in communication with a UL front end 754, which is coupled with one or more antennas 711*b*.

Similarly, the modem 720 includes one or more processors 722 and a memory 726 in communication with the one or more processors 722. The modem 720 is in communication with an RF front end 740, which may correspond to or be a part of to the RFEM 415 and 515 of FIGS. 4 and 5. The RF front end 740 may include circuitry for transmitting and receiving radio signals. For example, the RF front end 740 includes receive circuitry 742 and transmit circuitry 744. In some implementations, the receive circuitry 742 is in communication with a DL front end 760, which may include circuitry for receiving radio signals from one or more antennas 711c. The transmit circuitry 744 is in communication with a UL front end 765, which is coupled with one or more antennas 711d. In some implementations, one or more front-ends can be combined. For example, a RF switch can selectively couple the modems 710, 720 to a single UL front end 772 for transmitting radio signals using one or more antennas.

The modem 710 may include hardware and software components for time division multiplexing UL data (e.g., for NSA NR operations), as well as the various other techniques described herein. The processors 712 may include one or more processing elements configured to implement various features described herein, such as by executing program instructions stored on the memory 716 (e.g., a non-transitory computer-readable memory medium). In some implementations, the processor 712 may be configured as a programmable hardware element, such as a FPGA or an ASIC. In some implementations, the processors 712 may include one or more ICs that are configured to perform the functions of processors 712. For example, each IC may include circuitry configured to perform the functions of processors 712.

The modem 720 may include hardware and software components for time division multiplexing UL data (e.g., for NSA NR operations), as well as the various other techniques described herein. The processors 722 may include one or more processing elements configured to implement various features described herein, such as by executing instructions stored on the memory 726 (e.g., anon-transitory computer-readable memory medium). In some implementations, the processor 722 may be configured as a programmable hardware element, such as a FPGA or an ASIC. In some implementations, the processor 722 may include one or more ICs that are configured to perform the functions of processors 722.

Figure 8:
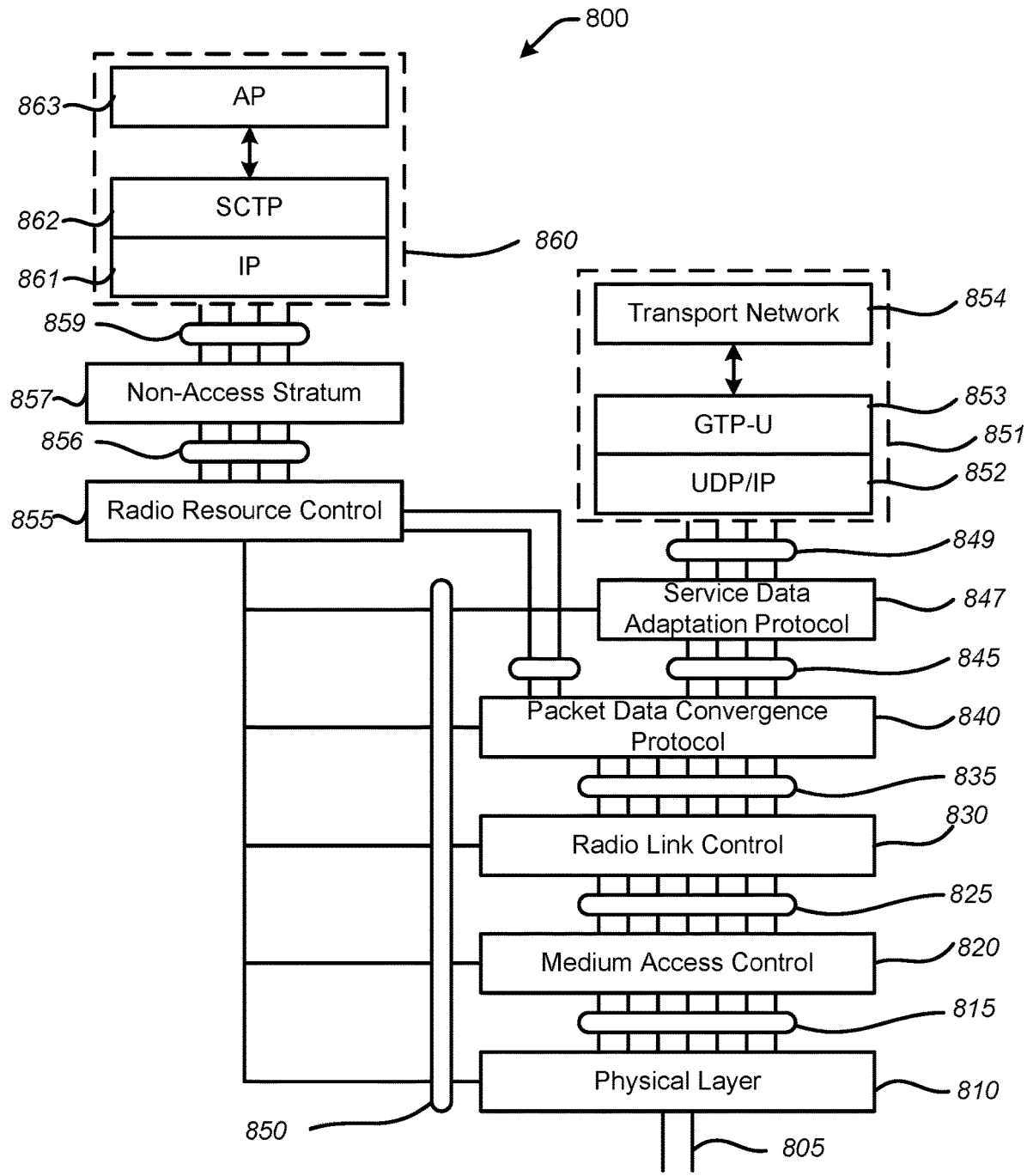
FIG. 8 illustrates example protocol functions that may be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5G NR system standards and the LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some implementations, an instance of PHY 810 may process requests from and provide indications to an instance of MAC 820 using one or more PHY-SAP 815. In some implementations, requests and indications communicated using PHY-SAP 815 can include one or more transport channels.

Instance(s) of MAC 820 may process requests from, and provide indications to, an instance of RLC 830 using one or more MAC-SAPs 825. These requests and indications communicated using the MAC-SAP 825 may include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 may include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some implementations, the SDAP 847 may only be used in NR implementations and may not be used in LTE implementations.

The RRC 855 may configure, using one or more management service access points (M-SAP), aspects of one or more protocol layers, which may include one or more instances of PHY 810, MAC 820, RLC 830, PDCP 840 and SDAP 847. In some implementations, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs can include one or more information elements (IEs), which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some implementations, one or more protocol entities of arrangement 800 may be implemented in UEs 101, RAN nodes 111, AMF 321 in NR implementations or MME 221 in LTE implementations. UPF 302 in NR implementations or S-GW 222 and P-GW 223 in LTE implementations, or the like to be used for control plane or user plane communications protocol stack between the aforementioned devices. In some implementations, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some implementations, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some implementations, a control plane protocol stack may include, in order from highest layer to lowest layer, NAS 857, RRC 855, PDCP 840. RLC 830, MAC 820, and PHY 810. In this example, upper layers 860 may be built on top of the NAS 857, which includes an IP layer 861, an SCTP 862, and an application layer signaling protocol (AP) 863.

In some implementations, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and can include elementary procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111: a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and can include XnAP basic mobility procedures and XnAP global procedures. The XnAP basic mobility procedures can include procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures can include procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111. The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 11 and an MME 221 within a LTE CN 120. The S1-AP 863 services can include two groups: UE-associated services and non UE-associated services. These services perform functions including, but not limited to:

E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures can include procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may include L2 and L1 layer communication links (e.g., wired or wireless) with the MME/AMF to exchange information.

In some implementations, a user plane protocol stack may include, in order from highest layer to lowest layer, SDAP 847, PDCP 840, RLC 830. MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components and functions.

Figure 9:
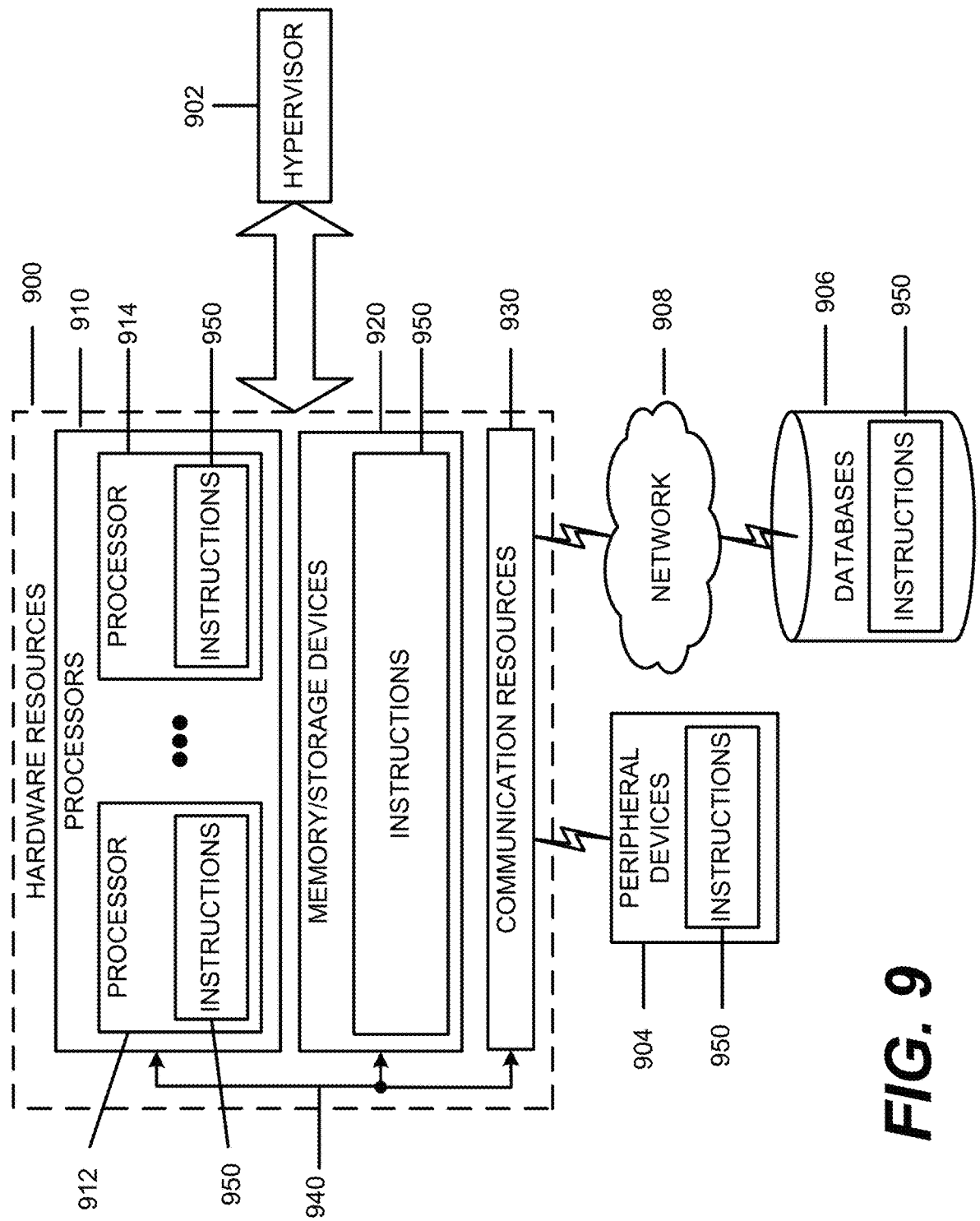
FIG. 9 illustrates an example of a computer system.

FIG. 9 illustrates a block diagram of example of a computer system that includes components for reading instructions from a machine-readable or computer-readable medium (e.g., a non-transitory machine-readable storage medium) and performing any one or more of the techniques described herein. In this example, FIG. 9 shows a diagrammatic representation of hardware resources 900 including one or more processors (or processor cores) 910, one or more memory or storage devices 920, and one or more communication resources 930, each of which may be communicatively coupled using a bus 940. For implementations where node virtualization (e.g., NFV) is utilized, a hypervisor 902 may be executed to provide an execution environment for one or more network slices or sub-slices to utilize the hardware resources 900.

The processors 910 may include a processor 912 and a processor 914. The processor(s) 910 may be, for example, a CPU, a RISC processor, a CISC processor, a graphics processing unit (GPU), a DSP such as a baseband processor, an ASIC, an FPGA, a radio-frequency integrated circuit (RFIC), another processor (including those discussed herein), or any suitable combination thereof. The memory/storage devices 920 may include main memory, disk storage, or any suitable combination thereof. The memory/storage devices 920 may include, but are not limited to, any type of volatile or nonvolatile memory such as DRAM, SRAM, EPROM, EEPROM, Flash memory, or solid-state storage, or combinations of them, among others.

The communication resources 930 may include interconnection or network interface components or other suitable devices to communicate with one or more peripheral devices 904 or one or more databases 906 using a network 908. For example, the communication resources 930 may include wired communication components (e.g., for coupling using USB), cellular communication components, NFC components, Bluetooth® (or Bluetooth® Low Energy) components, Wi-Fi components, and other communication components.

Instructions 950 can include software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

A UE can operate in a DRX mode to save UE power by avoiding monitoring for PDCCH continuously. DRX can also be referred to as a connected mode-discontinuous reception (C-DRX) mode. Information to configure a UE for DRX can be provided by a higher layer, such as RRC signaling. In a DRX mode, UE is configured to operate using a DRX cycle that includes a duration of active state and a duration of sleep state. In the active state, which can also be referred to as an ON state or a network access mode, the UE can receive transmissions from the network, such as DCI in a channel such as PDCCH, CSI measurement signaling, etc. In the sleep state, which can also be referred to as an OFF state or a power saving state, the UE is in a state where it does not receive any transmissions from the network.

Energy efficiency is of paramount importance for operation of 5G/NR UEs, which may have a diverse range of supported applications compared to LTE devices. In particular, energy consumption should be low when no data is expected/received by the UE. Traffic patterns in many 5G use cases can be bursty and served in short durations. Dynamic UE transitions between active state and sleep state may facilitate improved UE power consumption. In particular, control channel monitoring in a radio resource control connected (RRC_CONNECTED) mode that does not result in any data transmission contributes to a significant portion of UE power consumption. Hence, network assistance mechanisms can be used to reduce unnecessary physical downlink control channel (PDCCH) monitoring operations and trigger the UE to sleep whenever possible. Furthermore, in NR, control channel monitoring, operation bandwidth, and many other transmission parameters are specifically configured for a UE. Hence, UE-specific signaling mechanisms that address individual UE requirements and configuration can be provided. However, it may not always be feasible to assign control channel resources in a UE-specific manner, such as when load is high in the cell to which a UE is currently connected. If a group of UEs can monitor a common time-frequency resource, probability of control channel blocking and/or system overhead can be reduced.

This disclosure describes among other things various control channel signaling mechanisms where a group of UEs monitor for a common channel resource, and the control information can include UE-specific information grouped or multiplexed. In some implementations, the control information can include group-common information for the group of UEs. Several L1 control channel signaling mechanisms are described to adapt DRX configuration parameters and/or trigger go-to-sleep or wake-up behavior of UE. These can be adapted for diverse traffic types including arrival patterns in NR which can be bursty and can appear in short intervals. UE-specific control information transmitted over a group-common control channel resource signaling can allow for dynamic management of switching between active state and sleep state, and also minimize signaling overhead from the network perspective.

Factors that contribute most to UE power consumption in a connected state, such as RRC_CONNECTED, include PDCCH monitoring (often a UE monitors for PDCCH at the configured PDCCH occasions, which do not result in an assigned grant), operating bandwidth part size, number of UE receive/transmit (Rx/Tx) antennas and active radio frequency chains; and measurement operations.

A UE can operate in a DRX mode in order to save UE power by avoiding monitoring for PDCCH continuously. Typical DRX operation includes an ON duration, when the UE turns ON and monitors for transmissions from the network, as part of a DRX cycle. Existing solutions include higher layer configured DRX mode in a connected state where DRX configuration includes RRC configured parameters. Examples of such DRX configuration parameters are shown in Table 1. 3GPP TS 38.321 provides a detailed description of the parameters listed in Table 1, the content of which is incorporated in this disclosure by reference.

TABLE 1 drx-onDurationTinger: the duration at the beginning of a DRX Cycle, this is when UE monitors for at least PDCCHs;
drx-SlotOffiet: the delay before starting the drx-onDurationTimer;
drx-StartOffset: the subframe where the DRX Cycle starts;
drx-InactivityTimer: the duration after the PDCCH occasion in which a PDCCH indicates a new uplink (UL) or downlink (DL) transmission for the medium access control (MAC) entity;
drx-RetransinissionTimerDL (per DL HARQ process): the maximum duration until a DL retransmission is received;
drx-RetranstnissionTimerUL (per UL HARQ process): the maximum duration until a grant for UL retransmission is received;
drx-LongCycle: the Long DRX cycle;
drx-ShortCycle (optional): the Short DRX cycle;
drx-ShortCycleTimer (optional): the duration the UE shall follow the Short DRX cycle;
drx-HARQ-RTT-TimerDL (per DL HARQ process): the minimum duration before a DL assignment for hybrid automatic repeat request (HARQ) retransmission is expected by the MAC entity;
drx-HARQ-RTT-TimerUL (per UL HARQ process): the minimum duration before a UL HARQ retransmission grant is expected by the MAC entity.

In NR, a UE may support diverse traffic types and in some occasions, data can be quite bursty and delivered over a short duration. One set of semi-statically configured RRC parameters of DRX operation may not adapt well to diverse traffic patterns and bursty traffic. Certain aspects of this disclosure provide techniques to adapt DRX operation to the dynamic nature of traffic arrival patterns so as to minimize the power consumption of a given UE.

Based on nature of active traffic flow to/from a UE, one DRX configuration from a set of configured DRX configurations can be activated at a given time. One DRX configuration can include at least the set of parameters indicated in the above list in Table 1. A first DRX configuration is different from a second DRX configuration if at least the value of one parameter in the DRX configurations is different. Table 2 shows an example where K configurations may be configured for a UE by a higher layer, e.g., through RRC signaling, of which an index referring to one of the configurations can be indicated, e.g., by MAC control element (CE) or DCI. Each configuration can include one or more parameters from Table 1 and possibly more parameters, such as wake-up signal monitoring duration, offset to start location of wake-up signal monitoring duration, offset to start location of ON duration for control channel e.g., monitoring after wake-up signal is detected etc., further details of which are provided in the following sections.

TABLE 2

| DRX-Config Index | Configuration content |
|---|---|
| 0 | Parameter 1, Parameter 2, etc. |
| 1 | ... |
| ... | ... |
| K | ... |

A new MAC CE can be added to activate one of several configured DRX-Configs to be used for the MAC entity of the respective cell group or a serving cell. This can enable the UE to more quickly adjust multiple DRX parameters through a single MAC command, compared to the existing DRX configuration mechanism using a semi-static RRC reconfiguration message. The number of supported DRX-Configs per MAC entity, e.g., K in Table 2, can be a UE capability parameter or fixed in specification, and may further determine the size of MAC CE. Furthermore, in NR, a UE may be able to communicate with multiple numerologies, either in different bandwidth parts or carriers, where the UE may or may not be able to simultaneously transmit/receive with different numerologies. Transmissions with different numerologies require separate fast Fourier transformations (FFTs) and possibly different RF chains. Hence, in some designs, the UE may be configured with one or more numerology-specific or bandwidth part specific or carrier-specific DRX configurations.

In some implementations, different numerologies can be configured for different BWPs, and BWP switching can be performed by either explicit DCI command or background timer operation, e.g., bwp-inactivityTimer. If different DRX configurations are desired for different BWPs with various numerologies, it can be beneficial that the DRX configuration can be switched along with the BWP switching. To this end, the DRX configurations in Table 2 can be linked with a particular BWP ID and/or cell ID within the cell group. In some implementations, a DRX configuration with a larger value setting of drx-InactivityTimer may be configured for a default BWP compared to that of other UE-specific BWPs, which is technically motivated by the fact that the default BWP is typically used when a UE almost completes the data communications and a larger value has less an impact on packet latency.

A network, in some implementations, can provide dynamic L1 signaling for fast adaptation of DRX parameters, transition between active and sleep states, or both. In contrast to existing solutions where DRX mode is configured by RRC signaling, dynamic layer 1 (L1) signaling such as DCI, e.g., in a PDCCH transmission, can be used to notify a UE of adaptation of DRX parameters, activation of DRX mode, deactivation of DRX mode, go-to-sleep, or wake up from sleep. In some implementations, a dynamic L1 wake-up signal and/or go-to-sleep signal can be used to potentially increase the sleep duration of a UE. In some implementations, a DCI message for wake-up signaling or go-to-sleep signaling can be a group-common DCI (GC-DCI). Control information, for example, can be conveyed in a common downlink control channel that is monitored by a group of UEs. A DCI can be appended with a cyclic redundancy check (CRC) scrambled by a radio network temporary identity (RNTI) and transmitted via PDCCH.

A network can provide signaling such as a wake-up signal (WUS), go-to-sleep signal (GTS), or both. In regard to a WUS, the UE can be configured to receive signaling from the network during a sleep state. The signal, if detected properly, can trigger the UE to transition into the active state for a given subsequent duration to monitor for DCIs in, for example, PDCCH transmissions from the network. Following detection of a WUS, the UE may turn ON after a period or immediately. The UE may be triggered to wake up or monitor DCIs/PDCCH subsequent to detection of WUS for a duration that is part of a DRX cycle or for a duration that is not part of a DRX cycle.

In regard to GTS, the UE receives signaling from the network while it is in the active state. The GTS signal, if detected properly, can trigger the UE to transition to the sleep state for a given subsequent duration. Following detection of GTS, the UE may turn OFF after a period or immediately. The UE may be triggered to go to sleep subsequent to detection of the GTS signal for a duration that is part of a DRX cycle or for a duration that is not part of a DRX cycle.

A UE can be configured with DRX operation and operating with respect to one or more active DRX configurations. When a DRX cycle is configured, an Active Time (which can be based on 3GPP TS 38.321) includes the time while 1) drx-onDurationTimer, drx InactivityTimer drx-RetransmissionTimerDL, drx-RetransmissionTimerUL, or ra-ContentionResolutionTimer is running: or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

A UE can be configured to receive GTS signaling when the UE is in an active state. In some implementations, the UE can receive higher layer signaling: a GTS signaling parameter (with, e.g., an on or off value) provided by RRC, e.g., if on. UE monitors for GTS signaling; if off, UE does not monitor for GTS. Enabling or disabling of GTS signal monitoring can be group-specific, e.g., cell specific, or UE-specific configured (e.g., by dedicated RRC signaling).

The UE can be ON i) as part of a DRX cycle when the UE is in a configured/activated DRX mode with a given/indicated DRX configuration; or ii) when it is not configured/activated with any DRX mode and continuously monitoring for transmission/signaling from the network. GTS signaling can trigger the UE to sleep and stop monitoring PDCCH for a specified/configured/indicated sleep duration.

GTS signaling related parameters can include an offset to start position of the sleep duration parameter (T_GTS_A) and a sleep duration parameter (T_GTS_B). In some implementations, the UE may be configured by a higher layer (e.g., RRC signaling) using an index value for GTS periodicity and GTS slot offset, which points to a row in a predefined table mapping index values to GTS periodicities and offsets. In some implementations, the offset value may be defined relative to the beginning of the ongoing DRX cycle. In some implementations, parameters such as T_GTS_A and T_GTS_B can be indicated as part of GTS signaling or can be higher layer configured, for example, as part of a DRX configuration or GTS signaling configuration. In one example, T_GTS_A, T_GTS_B, or both can be pre-defined and given by a NR specification or a pre-defined mapping can be obtained based on one or more DRX parameters, such as DRX ON duration, drx-onDurationTimer and/or drx-InativityTimer etc. The unit of offset to start position of sleep duration, e.g., T_GTS_A and sleep duration, e.g., T_GTS_B can be in symbols or slots, for a given numerology or in a unit of time such as milliseconds.

The UE can be operating with a configured C-DRX mode within a BWP or a carrier, e.g., with a given DRX cycle with certain configured ON duration, when UE monitors for at least PDCCHs. The UE is configured to monitor L1 signaling for GTS during the active/ON state of the DRX mode. Depending on how long the ON duration is configured, GTS signaling can put the UE to sleep before the configured ON duration ends, see e.g., FIG. 10A where the GTS signal is received during a configured ON duration, or can trigger a micro-sleep within the ON duration, as shown in FIG. 10B. The ON duration can include one or more of the following: drx-onDurationTimer, drx-InactivityTimer, drx-RetransmissionTimerDL, drx-RetransmissionTimerUL, where in one example, drx-onDurationTimer is the minimum ON duration at the beginning of a DRX cycle, and other configured durations are used such as drx-InactivityTimer, drx-RetransmissionTimerDL, drx-RetransmissionTimerUL if there is a grant received for DL/UL transmission during drx-onDurationTimer.

Figure 10A:
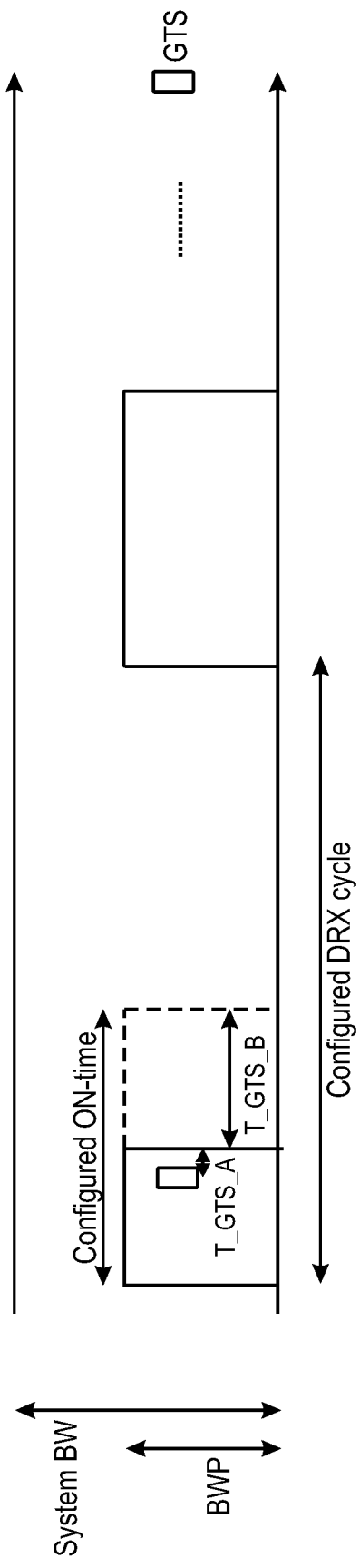
FIGS. 10A, 10B, and 10C illustrate different aspects of a DRX mode operation where a UE is configured to receive GTS L1 signaling during an ON state to put the UE to sleep.
Figure 10B:
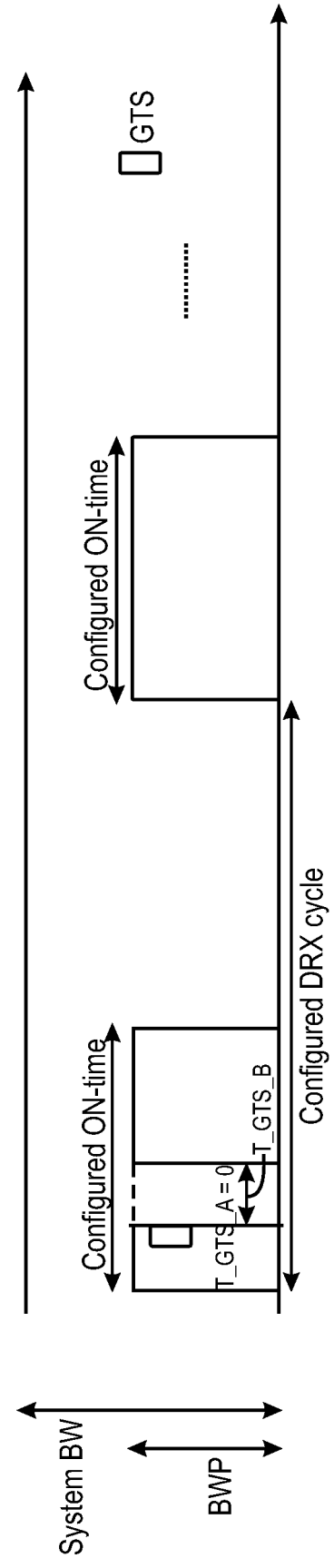
Figure 10C:
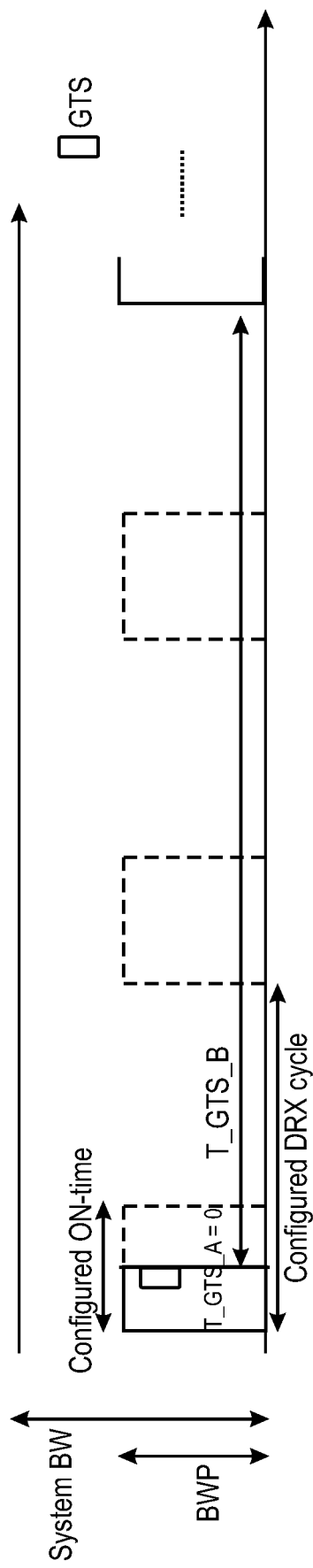

FIGS. 10A, 10B, and 10C illustrate different aspects of a C-DRX mode operation where a UE can receive GTS L1 signaling during ON state to put the UE to sleep. In these examples, L1 signaling for GTS triggers the UE to go to sleep. The UE continues to follow the existing DRX configuration where sleep or active state duration can be modified if a GTS trigger is received. The dashed area in FIGS. 10A-10C implies a skipped ON duration; this also applies to other subsequent figures unless mentioned otherwise.

In FIG. 10A, the UE can receive GTS L1 signaling during ON state to put the UE to sleep before the ON duration ends. In this example, T_GTS_B is set such that UE is put to sleep for the remainder of the configured ON duration. In FIG. 10B, the UE can receive GTS L1 signaling during ON state to put the UE to sleep for a micro-sleep within the configured ON duration. In this example, T_GTS_B is a comparatively small value which only triggers a micro-sleep and after the elapsed time, UE wakes up to monitor PDCCH or other signaling for the remainder of the ON duration. In FIG. 10C, the indicated or configured sleep duration when GTS trigger is received may span more than a DRX cycle. The UE skips waking up for two subsequent ON durations after GTS trigger is received and enjoys a prolonged sleep duration, in this example, the UE is signaled to sleep three DRX cycles starting from the DRX cycle where UE receives the GTS signaling.

In some implementations, the T_GTS_A parameter can be a function of UE capability or can be fixed in a NR specification. In another example, T_GTS_B may be a function of UE capability as well. For example, the T_GTS_B parameter in FIG. 10B may need to take into account how fast UE can wake up to monitor PDCCH for the remaining part of ON duration. In one example, it is also possible that T_GTS_B is set to a value which may be equal to or larger than the DRX cycle. In some cases, if network expects a given UE may not receive PDCCH for one or more subsequent DRX cycles, or if some latency can be tolerated for transmission, it may indicate a large T_GTS_B so that UE may be put to sleep spanning one or more subsequent DRX cycles, e.g., one or more subsequent ON durations are skipped, see, e.g., FIG. 10C.

In FIGS. 10A-C, T_GTS_A is shown as the duration between the location of GTS signal detection and start position of sleep duration. In some implementations, T_GTS_A may refer to an offset to the start position of sleep duration from a given reference point. In some implementations, the offset is counted from the first symbol when GTS signaling is received, e.g., from symbol i. In some implementations, the offset is counted from the next symbol after GTS signaling is received, e.g., if GTS signaling spans symbols i, i+1, . . . , i+K, K=>1, offset counting starts from symbol i+K+1, until the symbol before or when sleep duration starts, e.g., until symbol j−1 or j if sleep duration starts at j.

If GTS signaling spans symbols i, i+1, . . . , i+K, K=>1, until the symbol before or when sleep duration starts, the offset can be counted from the last symbol where GTS signaling is received, e.g., if GTS signaling spans symbols i, i+1, . . . , i+K, K=>1, offset counting starts from symbol i+K, until the symbol before or when sleep duration starts, e.g., until symbol j−1 or j if sleep duration starts at j. In some implementations, the offset can be counted from the slot boundary, e.g., from the beginning of the current slot where GTS signaling is received, until the symbol before or when sleep duration starts. In some implementations, the offset is counted from the beginning of current sub-frame or a given sub-frame until the symbol before or when sleep duration starts.

In some implementations, L1 signaling may trigger GTS along with switching one or more DRX parameters. For example, L1 signaling may switch the UE to a short DRX cycle from a long DRX cycle or vice versa. UE may assume the configured values of drx-ShortCycle and drx-ShortCycleTimer or L1 signalling may indicate these values explicitly which in this case over-rides the configured values. The remaining DRX parameters are RRC configured. In one example, the updated DRX parameters or switched DRX configuration may be effective after T_GTS_A expires or duration indicated by T_GTS_B ends or be applied after the end of current DRX cycle or from next Nth DRX cycle, N=>1. The parameter N may be fixed in specification, configured by higher layer signaling, or explicitly indicated in the L1 signaling.

In some implementations, the L1 trigger providing GTS may additionally indicate a BWP so that the UE wakes up in the different BWP indicated by the received GTS. UE may be in the new indicated BWP for a duration configured by a timer or until further signalling is received to switch. If a timer is configured, then upon expiry the UE reverts back to previous or a given default BWP and continues with configured DRX operation. In one example, the UE may switch to the new BWP in the next DRX cycle after the sleep duration indicated by the GTS signalling expires or the UE may switch to the new BWP after the end of the current DRX cycle or in next Nth DRX cycle, N=>1. In one example, UE may keep operating with a common DRX configuration for all bandwidth parts or, when switched to a different BWP, UE may assume a bandwidth part specific DRX configuration, if supported.

Figure 11:
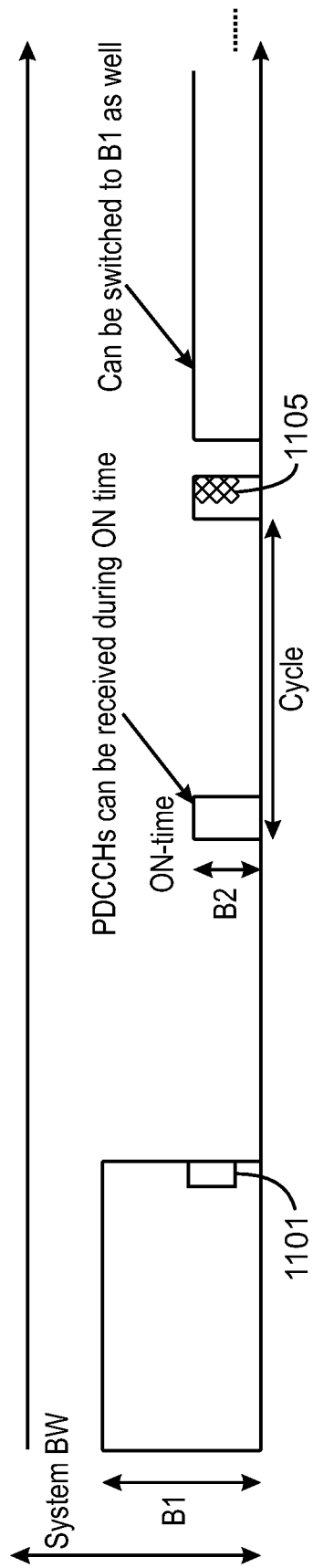
FIG. 11 illustrates an example of a timing sequence where a GTS indicates a BWP for a subsequent DRX cycle.

FIG. 11 illustrates an example of a timing sequence where a GTS indicates a BWP for a subsequent DRX cycle. UE is in an active state and continuously monitoring for DCIs, and L1 signalling is provided for GTS, activation of DRX mode, or both. The signalling can cause the UE to wake up on a different bandwidth part following the GTS indication when the next DRX cycle begins. In this example, the UE receives GTS signaling 1101 in bandwidth part B1. L1 signaling can indicate a different bandwidth part to the UE so that the UE is in a different bandwidth part B2 during the active/ON state in the DRX mode. As shown, B2 is a smaller bandwidth part compared to B1, which may provide a power saving gain.

The UE can be in an active state with or without any configured or activated DRX mode. In particular, if L1 signaling is used to activate DRX mode, UE can be configured to receive L1 signaling to provide GTS which may also serve as activation of DRX mode. In particular, as shown in FIG. 11, UE receives GTS signaling 1101, DRX activation signaling, or both and enters DRX mode when the UE is in active state and monitoring PDCCH. The DRX configuration can be configured a priori by RRC signaling or indicated as part of the L1 signaling that activates the DRX mode or put the UE to sleep. During the ON duration, UE can monitor for a scheduling DCI 1105 and if received, it may exit the DRX mode, e.g., scheduling DCI serves as deactivation of the DRX mode. In one example, if the DRX ON duration starts after an offset following the L1 signaling activating DRX mode, this L1 activation signaling can also indicates GTS. As shown in FIG. 11, the L1 signaling, e.g., GTS signaling 1101, can provide an activation of DRX mode and triggering the UE to go to sleep for a duration before DRX cycle starts. In one example, T_GTS_B is the duration before DRX cycle starts following the L1 activation. In another example, DRX cycle starts after a duration given by T_GTS_A+T_GTS_B following the L1 activation. The embodiments discussed in the context of T_GTS_A and T_GTS_B are applicable here as well for L1 activation of DRX mode when UE is in an active state. More generally, L1 activation signal can be received by the configured UE and the UE starts the DRX cycle following a delay/offset after activation signaling is received. The delay/offset may or may not comprise a duration of OFF/sleep state. The delay/offset before starting DRX signaling may be semi-statically configured by UE-specific RRC signaling. Alternatively, the delay/offset may be indicated in the L1 activation. The delay/offset may be a function of UE capability and/or it may depend on UE processing time of L1 activation.

In some implementations, UE may not be configured with a DRX configuration or may not have any activated DRX mode with a DRX configuration and L1 signaling for GTS may dynamically put the UE to sleep for a given duration. In this context, the L1 trigger for GTS may indicate the duration of the sleep and/or start position of the duration. In some implementations, GTS signaling may dynamically indicate that the UE skips monitoring following/subsequent N=>1 PDCCH monitoring occasions.

In regard to wake-up signaling, a UE can be configured to receive WUS following a sleep state when UE is operating in DRX mode with a given DRX configuration. In some implementations, UE can receive higher layer, e.g., RRC, signaling such as a WUS transmission parameter which can have an on or off value. If it is an on value, UE monitors for WUS. If it is an off value. UE does not monitor for WUS. Enabling or disabling of WUS monitoring can be group-specific, e.g., cell specific, or UE-specific configured (e.g. by dedicated RRC signaling). In one example, UE can receive WUS to transition from deep sleep state to light sleep state or active state or from light sleep state to active state.

UE can be configured with a WUS monitoring duration. The UE is only ON for this duration, unless WUS is detected which would require the UE to wake up and monitor for a configured ON duration for regular PDCCH and other signaling monitoring. This may result in more power saving compared to the case when UE always wakes up for a configured ON duration for PDCCH monitoring which can be much longer than duration of WUS monitoring. In one example, UE may monitor WUS every N DRX cycles, N being positive integer. Value of N can be UE-specific configured, by RRC signaling. As mentioned above, configured ON duration following WUS detection, e.g., for PDCCH monitoring, can include one or more of drx-onDurationTimer, drx-InactivityTimer. Note that WUS monitoring duration may additionally be used for beam management and/or other necessary synchronization operation if needed, which in one example can be performed even before UE monitors WUS. In one example, WUS may provide additional information for the UE to attain or maintain synchronism with one or more cells.

To this end, a parameter can be identified such as monitoring window for WUS drx-onDurationTimer-WUS which in one example, can be configured in addition to drx-onDurationTimer, where in one example, drx-onDurationTimer>drx-onDurationTimer-WUS. drx-onDurationTimer does not start unless WUS is detected during drx-onDurationTimer-WUS. A DRX configuration may include drx-onDurationTimer-WUS as part of the configuration. In one example, the minimum ON duration every DRX cycle is drx-onDurationTimer-WUS, unlike drx-onDurationTimer which is the minimum ON duration in existing C-DRX mode operation that does not reply on WUS.

Figure 12D:
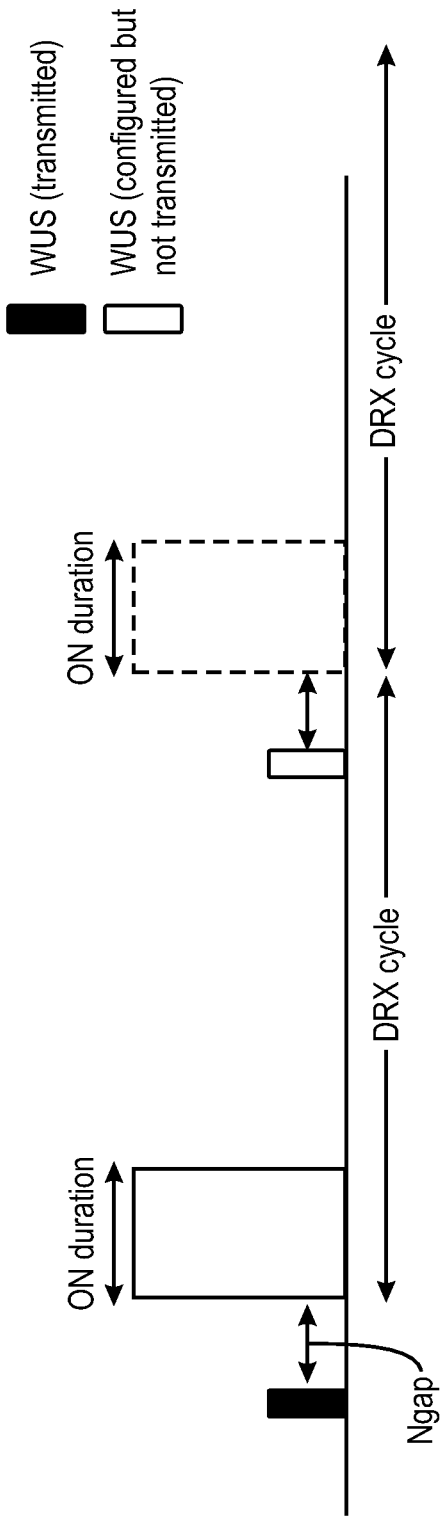

FIGS. 12A, 12B, 12C, and 12D illustrate different examples of wake up signaling. The UE turns ON for monitoring WUS for a limited duration according to a configured DRX cycle. In FIG. 12A, upon detection of a WUS, the UE wakes up and monitors for a configured ON-time duration after a period of time. In FIG. 12B, upon detection of a WUS, the WUS may trigger the UE to switch BWP for active state operation. In FIG. 12C, upon detection of a WUS, the UE immediately starts monitoring for PDCCH and other signaling for the configured ON-time duration. In these examples, the UE is operating with a DRX mode with two configured ON-times: drx-onDurationTimer (e.g., configured ON-time in FIGS. 12A-C) and drx-onDurationTimer-WUS (e.g., ON-time (WUS) in FIGS. 12A-C). In FIGS. 12A-B, there is a gap between when drx-onDurationTimer-WUS ends and drx-onDurationTimer starts. In FIG. 12B, it is assumed that WUS may potentially indicate a BWP, e.g., UE wakes up and starts monitoring for regular PDCCH or scheduling DCI in a different, possibly, larger BWP than used for WUS monitoring. In another example, similar to what is shown in FIG. 12B, WUS can be monitored in a small BWP (e.g., BWP 1) and if detected, UE may switch to a default/configured bandwidth part (e.g., BWP 2) or the bandwidth part where the UE was previously in before DRX mode was configured. In FIG. 12C, it is assumed that drx-onDurationTimer starts immediately after drx-onDurationTimer-WUS ends and WUS is detected.

A parameter can be identified $N_{gap}$ which indicates the inactivity duration which starts after drx-onDurationTimer-WUS expires and ends before drx-onDurationTimer starts. $N_{gap}$ can be expressed in symbols or slots in a given numerology or in ms. In some designs $N_{gap}$ can be indicated as part of the WUS signaling. In one example, if UE detects WUS early during the monitoring window, UE may sleep for the remaining duration of the monitoring window and turns ON when configured ON duration for PDCCH monitoring starts. In that context, $N_{gap}$ can be expressed as the time between the location of successful detection of WUS and when ON duration for PDCCH monitoring starts. Alternatively, the $N_{gap}$ can still be defined as the duration between the end of WUS monitoring occasion and the start of on-duration for PDCCH monitoring.

In some implementations, if UE is configured to monitor WUS, the DRX cycle may start with the ON time for WUS monitoring, e.g., drx-onDurationTimer-WUS can be the duration at the beginning of a DRX cycle instead of drx-onDurationTimer as in existing solutions that do not include WUS monitoring. In that context, drx-SlotOffset may indicate the delay before starting the drx-onDurationTimer- WUS. drx-onDurationTimer may start after an offset or immediately upon detection of WUS. In some implementations, a DRX cycle can begin with drx-onDurationTimer as in legacy systems and an offset can be configured to identify the location of WUS monitoring window, e.g., UE can be configured to turn ON for the WUS monitoring window, e.g., drx-onDurationTimer-WUS before the configured location where drx-onDurationTimer is supposed to start if WUS is detected where there can be an offset between when drx-onDurationTimer-WUS ends or WUS is detected and drx-onDurationTimer starts.

In some implementations, the start position of ON duration for PDCCH monitoring drx-onDurationTimer may be indicated as offset to a reference point, e.g., a given/current sub-frame or slot boundary or where DRX cycle starts or the location/control resource set, e.g., CORESET, where WUS is detected or when monitoring window for WUS ends. This additional offset parameter can be part of a DRX configuration, e.g., if SlotOffset is used to indicate the delay before DRX cycle starts with drx-onDurationTimer-WUS or the offset can be dynamically indicated as part of WUS. In one example, WUS may dynamically indicate ON duration drx-onDurationTimer. Indicated ON duration may override the configured ON duration as part of DRX configuration. The indicated ON duration may span one or more DRX cycles. In FIGS. 12A-C, a DRX cycle starts from the monitoring window for WUS, e.g., drx-onDurationTimer-WUS FIG. 12D illustrates an example of a WUS configuration for on-off DRX operation. In this example, the WUS monitoring window or duration may be $N_{gap}$ symbols or slots for a given numerology or milliseconds before the beginning of a configured DRX cycle so as to keep the PDCCH monitoring activity in a DRX cycle, as in legacy, if it occurs. If UE does not detect the WUS signal in the monitoring window or occasion that indicates UE to perform DRX operations in the next M DRX cycles, the UE will skip the PDCCH monitoring in the next M DRX cycles. If detected, the legacy DRX operation is performed, e.g., UE turns ON at the beginning of the DRX cycle for a configured ON duration for PDCCH monitoring. The values of M may be fixed in specifications or configured by higher layers and/or one value of M is dynamically indicated by WUS at least based on the real-time traffic characteristic of the said UE. In addition, $N_{gap}$ value may be reported by UE as part of UE capability and then configured accordingly. It is assumed that M=1 in FIG. 12D.

In some implementations, L1 signaling may trigger WUS along with switching one or more DRX parameters. For example, L1 signaling may switch the UE to a short DRX cycle from a long DRX cycle. In some implementations, the UE may assume the configured values of dry-ShortCycle and drx-ShortCycleTimer or L1 signalling may indicate these values explicitly which in this case over-rides the configured values. The remaining DRX parameters are RRC configured. In some implementations, WUS may indicate whether UE exits the DRX mode or just wakes up for the subsequent ON duration for monitoring scheduling DCI. In some implementations, the L1 trigger providing WUS may additionally indicate bandwidth part so that the UE wakes up in a different bandwidth part, see, e.g., FIG. 12B. UE may be in the new bandwidth part for a duration configured by a timer or until further signalling is received to switch. If a timer is configured, then upon expiry UE reverts back to previous or a given default bandwidth part and continue with configured DRX operation.

Figure 13A:
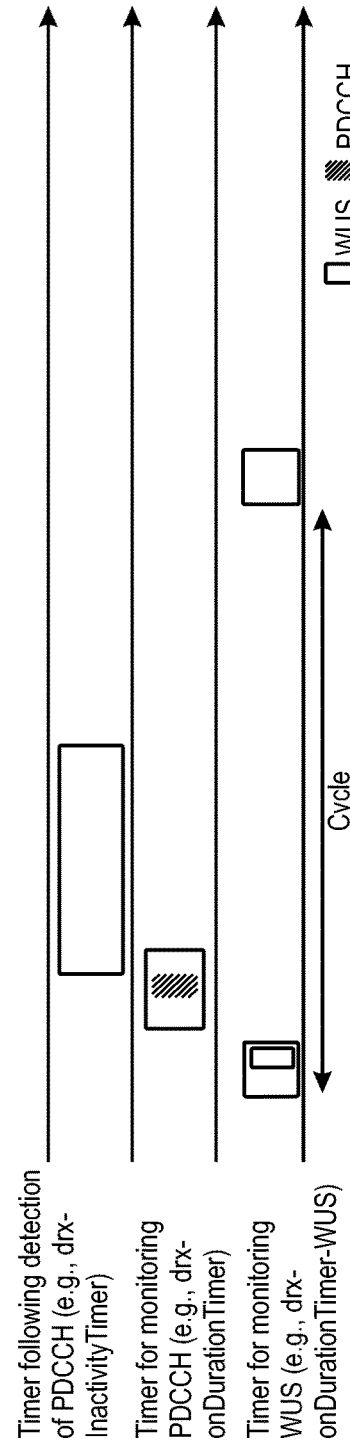
FIGS. 13A, 13B, and 13C illustrate different examples of a monitoring timer for WUS, PDCCH, and subsequent PDSCHs.
Figure 13B:
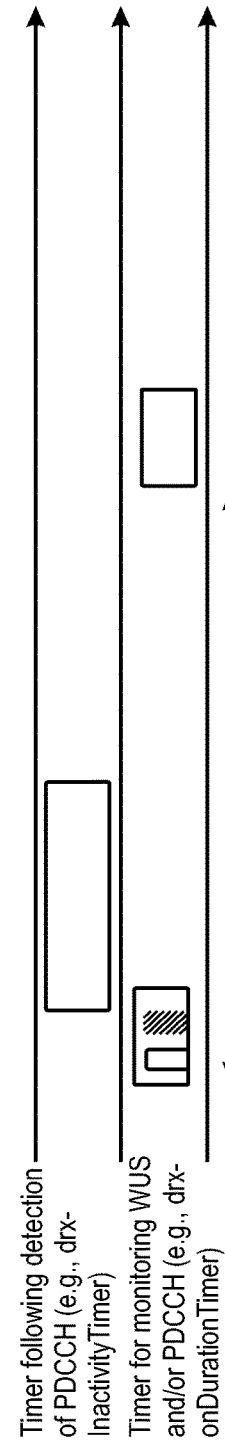
Figure 13C:
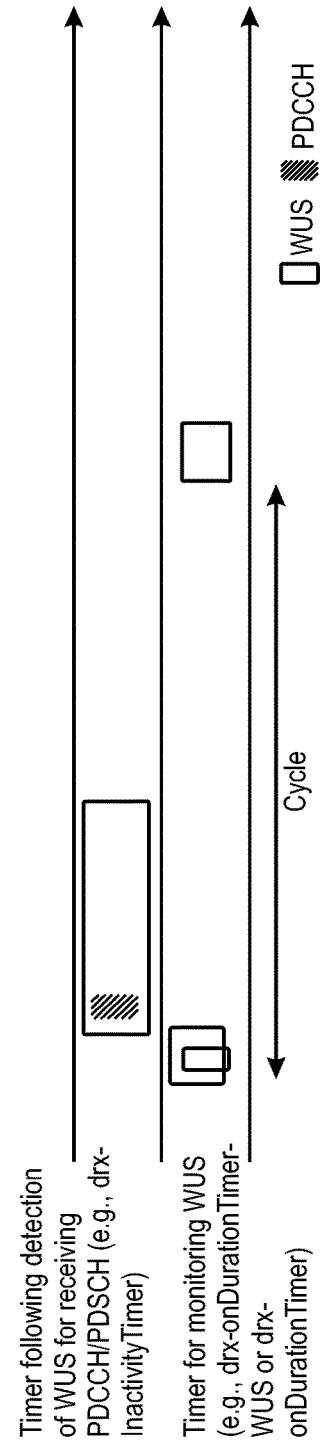

FIGS. 13A, 13B, and 13C illustrate different examples of a monitoring timer for WUS, PDCCH, and subsequent PDSCHs. WUS detection implies that UE may receive PDCCH/scheduling DCI or other transmission from network soon. The timers considered in the examples in FIGS. 13A-C can be UE-specific or group-specific configured, by RRC signalling. One or more of the timers can be part of a DRX configuration.

In FIG. 13A, UE monitors for WUS according to a timer, such as drx-onDurationTimer-WUS. If UE detects WUS, UE turns ON and monitors for PDCCH subsequently, for a duration given by another timer, such as drx-onDurationTimer. If UE detects PDCCH, UE starts another timer, such as drx-InactivityTimer for subsequent PDSCH and further PDCCH monitoring and detection. The timer for monitoring PDCCH may start X=>1 symbols or slots after successful detection of WUS, for a given numerology. Similarly, the timer for PDSCH and/or subsequent PDCCH and/or other transmission reception may start X=>1 symbols or slots after successful detection of PDCCH, for a given numerology.

In FIG. 13B, two timers are configured instead of the three for the example in FIG. 13A. As detection of WUS implies PDCCH for a UE is imminent, an ON duration timer is used which can be used for both monitoring WUS and/or PDCCH. PDCCH monitoring follows WUS detection of course. Note that WUS can be transmitted in a sequence or PDCCH/DCI. If WUS is transmitted in a PDCCH, then UE just monitors for PDCCH directly, according to the PDCCH monitoring configuration for WUS, which may be different from regular PDCCH monitoring for data scheduling. Example in FIG. 13B assumes initial timer when UE turns ON, as part of DRX cycle contains one or more PDCCH monitoring occasions and/or one or more WUS monitoring occasions. After UE detects WUS, UE may start monitoring for PDCCH in one or more subsequent occasions. After detection of PDCCH, UE starts another time for receiving a subsequent PDSCH and/or PDCCH and/or other transmissions from network. Here, the first timer may be drx-onDurationTimer where UE monitors for both WUS and/or scheduling DCI/PDCCH. It may be possible that WUS is transmitted in a PDCCH or sequence as well. The second timer can be analogous to drx-InactivityTimer, which may start X=>1 symbols or slots after successful detection of PDCCH, for a given numerology. In one example, UE monitors for WUS PDCCH at M=>1 occasions during the timer, and once WUS is detected, UE monitors for regular PDCCH at N=>1 occasions out of K=>N occasions configured within the timer. In other words, after detection of WUS, there may be only N occasions remaining within the timer to monitor for PDCCH/scheduling DCI. The PDCCH carrying WUS and PDCCH for scheduling may have different configuration and monitoring properties.

In FIG. 13C, two timers are configured instead of the three for the example in FIG. 13A. As detection of WUS implies PDCCH for a UE is imminent, an ON duration timer is used which can be used for monitoring WUS, such as drx-onDurationTimer or drx-onDurationTimer-WUS. Upon detection of WUS, UE starts another timer for PDCCH and/or PDSCH reception, a timer that can be analogous to drx-InactivityTimer. In this example, the difference compared to the legacy system is that in the legacy system drx-onDurationTimer is used for monitoring PDCCH and drx-InactivityTimer starts after detection of PDCCH. In this example, it is assumed that an initial ON duration timer is used, such as drx-onDurationTimer or drx-onDurationTimer-WUS for monitoring WUS only. Note that WUS can be transmitted in a sequence or in a PDCCH, where in one example, the PDCCH can be a scheduling DCI as well. Alternatively, WUS can be transmitted in a different PDCCH (e.g., not scheduling DCI) or a sequence. In this example, the second timer includes monitoring occasions for receiving PDCCHs/scheduling DCIs and receiving subsequent PDSCHs, e.g., unlike legacy systems, here UE may start the second timer before receiving PDCCH. Unless WUS is transmitted in a scheduling DCI or PDCCH, scheduling DCI/PDCCHs are received during the second timer, such as drx-InactivityTimer. Here, UE starts drx-Inactivity-Timer following detection of WUS because network is likely to send WUS because there is a PDCCH going to be sent to the UE, and UE can just start drx-InactivityTimer right away for receiving PDCCH/PDSCHs, instead of using another intermediate timer, as shown in FIG. 13A. Hence, in one example, drx-onDurationTimer may be re-defined in NR which may include monitoring occasions of WUS only, and drx-InactivityTimer may be re-defined which may include monitoring for PDCCH/scheduling DCIs and subsequent PDSCHs. Of course, drx-InactivityTimer may be triggered multiple times if needed, such as when UE receives PDCCH near the end of current drx-InactivityTimer. The second timer may start after X=>1 symbols or slots following successful detection of WUS during first timer, based on a given numerology. In one example, if WUS is transmitted in a scheduling DCI (or, if receiving a first scheduling DCI serve as WUS as well, implicitly/explicitly) during the first timer such as drx-onDurationTimer or drx-onDuration-Timer-WUS, the corresponding PDSCH may be transmitted in the second timer, such as drx-InactivityTimer.

Various types of DRX mode operations, in some implementations, can be configured for a UE in connected mode, including type 1 and type 2 modes. A type 1 mode is an activation or de-activation of DRX mode with at least one DRX configuration by RRC or MAC CE. A type 2 mode is an activation or de-activation of DRX mode with at least one DRX configuration by L1 signaling.

There are different type 1 modes. In type 1a, RRC signaling can be provided to configure one or more DRX parameters, and can in some cases switch DRX configuration. In type 1b, L1 signaling can be provided to update DRX parameters, and can in some cases switch DRX configuration. L1 signaling can also indicate a GTS or WUS. In type 1c, RRC signaling or a combination of L1 and RRC signaling can be provided to configure one or more DRX parameters, and can in some cases switch DRX configuration. L1 signaling in type 1c can also indicate a GTS or WUS. In type 1d, a MAC control element (MAC-CE) may be introduced for DRX parameters reconfiguration, which is identified by a MAC protocol data unit (PDU) subheader with a dedicated Logical Channel Group ID (LCID). In addition, it may have a fixed size and consist of a field to indicate the DRX parameter set or configuration index to be applied by MAC entity. In addition, L1 signaling can be provided to indicate a GTS or WUS.

There are different type 2 modes. In type 2a. RRC or MAC CE signaling can be provided to configure one or more DRX parameters, and can in some cases switch DRX configuration. In type 2b, L1 signaling can be provided to update DRX parameters, and can in some cases switch DRX configuration. L1 signaling can also indicate a GTS or WUS. In type 2d, RRC and MAC CE signaling or a combination of L1, RRC, and MAC CE signaling can be provided to configure one or more DRX parameter, switch a DRX configuration, and provide a GTS or WUS indication.

In some implementations, activation of DRX mode with at least one DRX configuration does not necessarily imply DRX configuration index is always indicated in the L1 signaling that provides activation trigger, rather it may also be possible that UE is configured with at least one DRX configuration by prior higher layer signaling such as RRC signaling, and L1 activation signaling just turns ON the DRX mode with the previously indicated DRX configuration.

In some implementations, RRC signaling or L1 signaling may activate the DRX mode which may expire based on a timer. For example, if UE receives a subsequent L1 signaling trigger such as WUS or scheduling DCI in ON duration, which may serve as indication to terminate DRX mode, UE may exit the DRX mode, otherwise the UE may continue to operate in DRX mode until the timer expires.

Examples of L1 signaling include sequence-based or DCI-based transmission, e.g., in a PDCCH or a combination of them, where both can be UE-specific or group-common. The unit of one or more of different configured or indicated durations or periodicity or offset can be expressed in sub-ms, ms, symbols, or slots of a given numerology. Other types of units are possible. Examples of higher layer signaling in the context of following embodiments include NR minimum system information (MSI), NR remaining minimum system information (RMSI), NR other system information (OSI) or radio resource control (RRC) signaling, where RRC signaling can be UE-specific or group common.

A wireless system can provide a DCI based L1 signaling mechanism where a group of UEs monitor a common time-frequency resource to obtain control information which can be UE-specific, group-common, or both. The DCI can be transmitted in a PDCCH associated with a common RNTI. In some implementations, the DCI can be transmitted in a sequence without associating any RNTI.

The network can transmit a DCI in a PDCCH with a common RNTI. In a given cell, a group of UEs can be formed to monitor a DCI format which is appended with a CRC that is masked with a common RNTI, e.g., PDCCH associated with a common RNTI such as power saving RNTI (PS-RNTI) or DRX RNTI or GTS RNTI or WUS RNTI, depending on the functionality of the DCI format. The RNTI can be configured by higher layers via NR minimum system information (MSI), NR remaining minimum system information (RMSI), NR other system information (OSI) or radio resource control (RRC) signaling. DCI with common RNTI may be received in a common time-frequency resource, such as a common search space or in a UE-specific time-frequency resource such as UE-specific search space.

Figure 14:
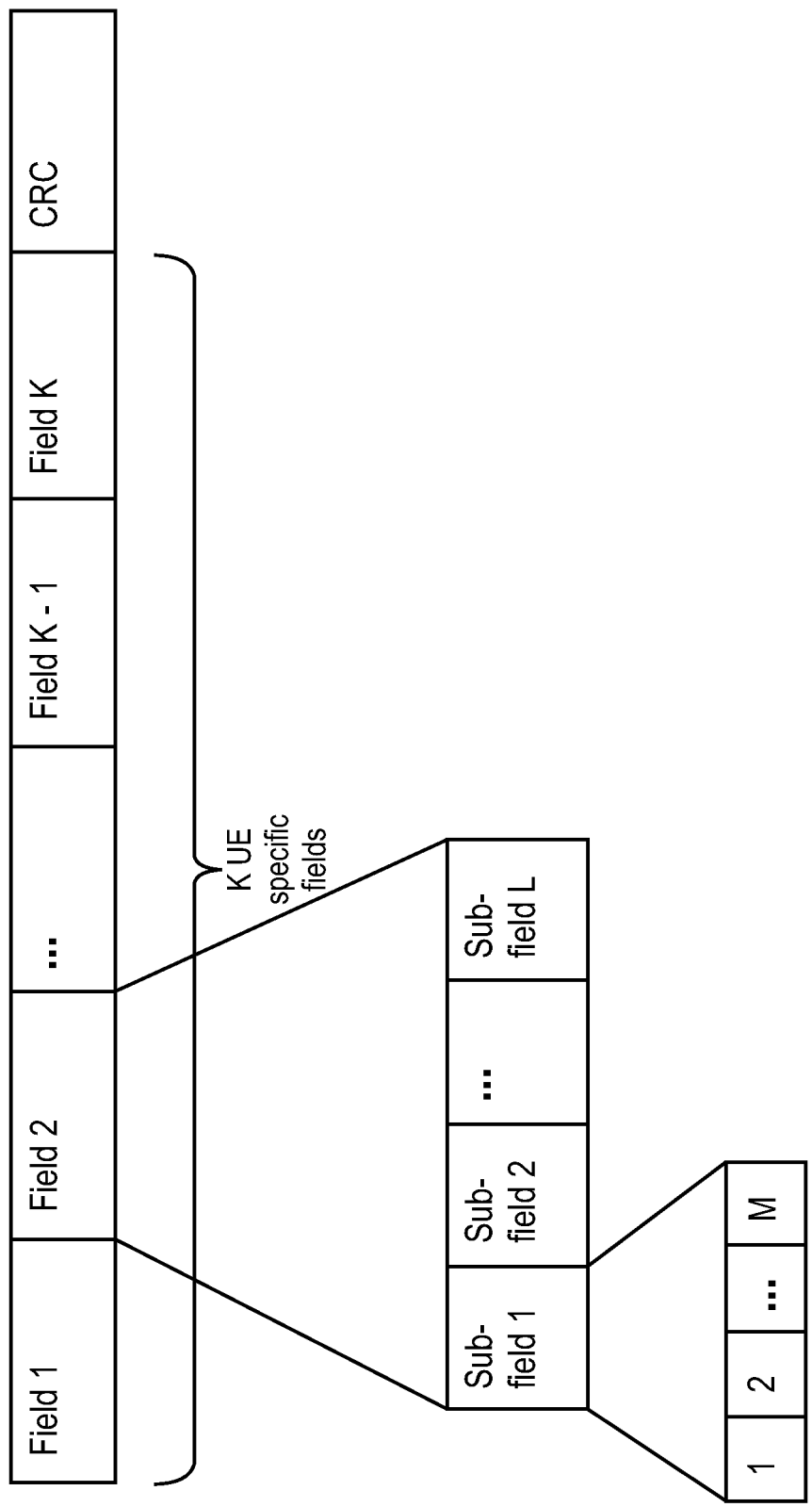
FIG. 14 illustrates an example of a common DCI format structure with UE-specific fields.

FIG. 14 illustrates an example of a common DCI format structure with UE-specific fields. The DCI based on this format can be a GC-DCI containing UE-specific content. In this example, there are K fields in the DCI structure shown in FIG. 14. Each field is UE-specifically configured and contains information for a given UE. The network can map UEs to respective fields in the DCI. The mapping can be obtained by the UE via a higher layer signaling, such as RRC signaling. Each UE-specific field may have L sub-fields, where each sub-field may have M bits. A CRC can also be included in the structure to product information contained in the fields. There are LM bits in each UE-specific field. Excluding the CRC bits, the DCI format has a total of KLM bits. In FIG. 14, an example is shown were K fields or blocks are configured in the DCI for K UEs, e.g., each field is UE-specifically configured and contains information for a given UE.

In some implementations, a common DCI format can be used for signaling GTS. In some implementations, each UE-specific field includes a single bit, where a bit value of 1 indicates a GTS, and bit value of 0 indicates that there is no GTS trigger for the given UE. In an example DCI transmission of {0, 1, 0, 0, 1, <CRC>} there are K=5 UE-specific fields for respective UEs which are configured to monitor a common DCI. In this transmission, only UEs mapped to $2^{nd}$ and $5^{th}$ fields have a GTS indicated trigger, the other UEs do not have a trigger. Upon detecting the DCI transmission. UEs mapped to the $2^{nd}$ and $5^{th}$ fields may go to sleep, whereas other UEs continue to be in active state either until the end of a configured ON duration or until further signaling is received.

In some implementations, each UE-specific field includes a single bit to indicate activation or deactivation of a DRX mode. In this bit, a value of 1 can indicate an activation of a DRX mode with a given DRX configuration for the respective UE. If the UE is not operating based on any DRX mode, then activation of DRX mode may alternatively serve as GTS as well, for example, when UE sleeps for an offset before DRX cycle starts. GTS signaling can trigger periodic ON/OFF behavior for a UE which can be similar to an activation of a DRX mode. In some implementations, GTS signaling can indicate sleep duration for an instance without implying any periodicity. e.g., UE wakes up after indicated sleep duration and resume operation according to pre-existing configuration. In some implementations, if the DCI only provides a GTS trigger, UEs that received the trigger (e.g., a bit value of 1), may follow UE-specific configured set of parameters such as T_GTS_A, T_GTS_B, or both. UEs may continue to follow existing DRX configuration after sleep duration expires.

Figure 15:
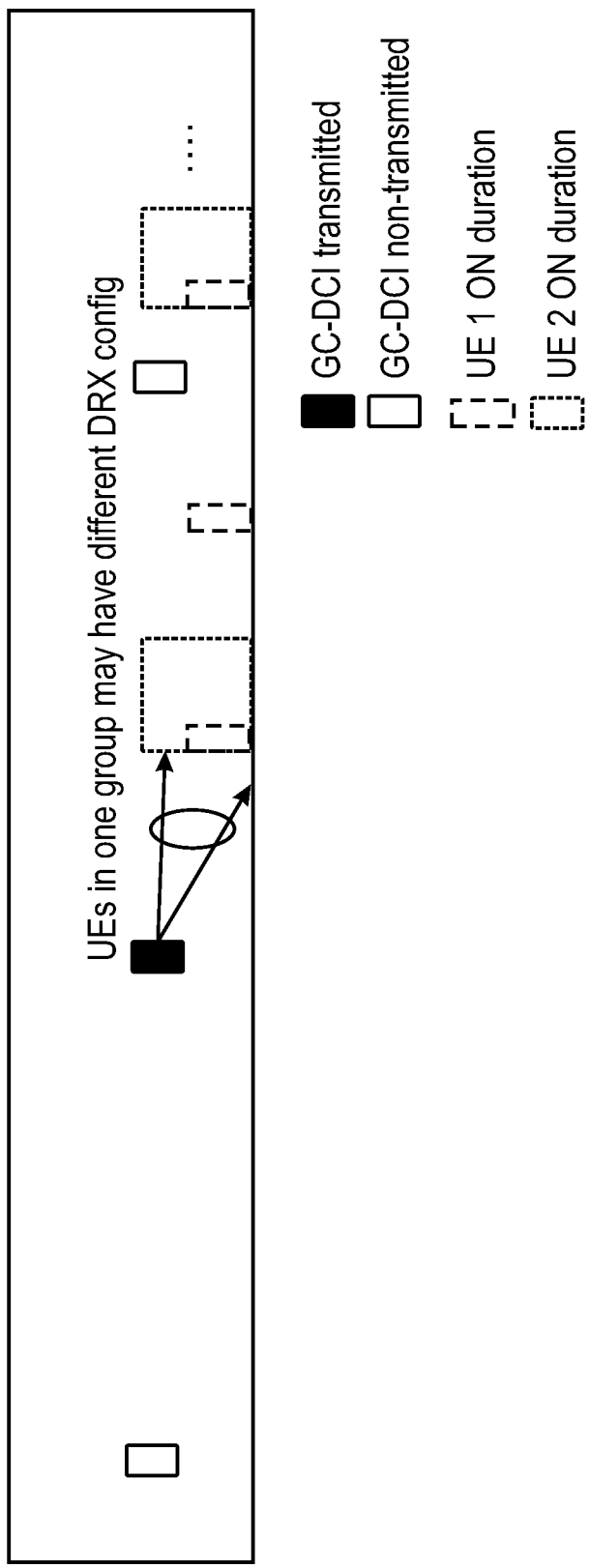
FIG. 15 illustrates an example where two UEs receive GTS triggers in a GC-DCI, however each UE has different DRX configurations.

FIG. 15 illustrates an example where two UEs receive GTS triggers in a GC-DCI, however each UE has different DRX configurations. In general, multiple UEs receiving a GTS trigger or an activation trigger in the GC-DCI can have different DRX configurations such as different DRX cycles, different ON durations, or both.

Higher layer configuration information can be provided to UE so that UE reacts accordingly following a GTS trigger. The configuration information can cause the UE to start a sleep duration after an offset, if an offset is configured. If not, then how fast UE can go to sleep may be subject to UE capability, e.g., as soon as it detects the GTS trigger as TRUE and turn off the RF or baseband components. In some implementations, the configuration information can cause the UE to sleep for a given duration. Duration may also be function of configured ON duration such as UE sleep for the remainder. In some implementations, the configuration information can cause the UE to switch to a different BWP in the next Kth DRX cycle, K=>1. In some implementations, the configuration information can cause the UE to monitor for a reduced number of PDCCH candidates for one or more of the subsequent ON durations.

In some implementations, one or more UE-specific configurations can be dynamically indicated in one or more UE-specific fields, such as: an offset to the start position of sleep duration; sleep duration; BWP ID, if the UE wakes up in a different BWP subsequent to the sleep duration; switch DRX parameters within the existing DRX configuration, e.g., switching between long and short DRX cycles; and an index of a DRX configuration where the UE-specific field may include more than one bit, may have more than one sub-fields, or both to dynamically indicate one or more parameters. In some implementations, the UE-specific field can include K bits, where the field indicates an index value corresponding to a configuration from a set of configurations. Each configuration can include one or more of the above parameters or indications. For example, the UE-specific field may have 2 bits which may be configured according to Table 3.

TABLE 3

| Bit Value | Indicated Value |
|---|---|
| 00 | GTS trigger FALSE |
| 01 | GTS trigger TRUE and a first pair of {T_GTS_A, T_GTS_B} |
| 10 | GTS trigger TRUE and a second pair of {T_GTS_A, T_GTS_B} |
| 11 | GTS trigger TRUE and a given bandwidth part ID for switching |

A common DCI format can be used for signaling WUS. In some implementations, the each UE-specific field may include a single bit, where a bit value of 1 indicates a wake-up, and a bit value of zero may indicate no wake-up for the given UE. In an example DCI transmission of {0, 1, 0, 0, 1, <CRC>} there are K=5 UE-specific fields for respective UEs which are configured to monitor a common DCI. In this transmission, only UEs mapped to $2^{nd}$ and $5^{th}$ fields have a WUS indicated trigger, the other UEs do not have a trigger. Upon detecting the DCI transmission, UEs mapped to the $2^{nd}$ and $5^{th}$ fields may wake-up for a subsequent duration to monitor scheduling DCIs or other PDCCHs, whereas other UEs do not wake-up and return to sleep until the end of given DRX cycle or until the next WUS monitoring occasion.

One or more UE-specific configurations can be dynamically indicated in the UE-specific fields. Such configurations can include one or more of the following: a $N_{gap}$ or an offset to the start position of ON duration for PDCCH monitoring, e.g., drx-onDurationTimer or drx-InactivityTimer; ON duration for PDCCH monitoring; bandwidth part identifier, if the UE wakes up in a different bandwidth part subsequent to WUS detection; switch DRX parameters within the existing DRX configuration, e.g., switching between long and short DRX cycles; an index of a DRX configuration; a set (e.g., possibly of reduced size) of PDCCH candidates to monitor for one or more of the subsequent ON durations; and a de-activation of DRX mode. In some implementations, the UE-specific field can include more than one bit, may have more than one sub-field, or both to dynamically indicate one or more parameters. One or more parameters that are not dynamically indicated can be instead higher layer configured or not supported as part of a supported feature following WUS detection or indicated as part of a different signaling.

In some implementations, K set of PDCCH monitoring candidates during ON duration can be configured by higher layers via UE-specific RRC signalling. The L1 signalling of WUS may dynamically indicate which one set of PDCCH monitoring candidates is used during the ON duration. For instance, one or more search space set or a subset of search space sets or one or more CORESET may be disabled for PDCCH monitoring during ON duration for power saving. In some implementations, a UE-specific field can include K bits which indicate an index of a configuration from a set of configuration sets. Each configuration can include one or more of the above parameters or indications. For example, UE-specific field may have 2 bits which may be configured according to Table 4. In this table, A given value of $N_{gap}$, ON duration for PDCCH monitoring, or bandwidth part ID can be chosen/mapped to the corresponding bit value labels from a set of supported values of the parameters.

TABLE 4

| Bit Value | Indicated Value |
|---|---|
| 00 | WUS trigger FALSE |
| 01 | WUS trigger TRUE and de-activation of DRX mode |
| 10 | WUS trigger TRUE and a given value of $N_{gap}$ and/or a given value of ON duration for PDCCH monitoring |
| 11 | WUS trigger TRUE and a given value of bandwidth part ID |

In some implementations, if activation or deactivation of DRX mode is dynamically indicated, GTS and WUS signaling may serve as activation and deactivation signaling respectively, more generally, UE can be configured to receive one or more indications in the UE-specific field in a common DCI. Such indications can include: activation signaling; activation signaling with GTS, e.g., UE starts DRX cycle after an offset or sleep duration; GTS signaling without activation, e.g., GTS signaling can be received independently, e.g., a GTS signaling can be received to put the UE in a micro-sleep, and after expiry, UE resumes DRX mode operation; deactivation signaling; deactivation signaling with WUS, e.g., WUS signaling itself serve or indicate deactivation of DRX mode; and WUS signaling without deactivation, e.g., UE just monitors for ON duration for PDCCH monitoring after WUS detection and does not leave DRX mode.

The same common RNTI, in some implementations, can be used to detect GTS and WUS, if configured for a UE to monitor. As GTS and WUS can be monitored in different occasions, separate RNTI may not be needed, from a UE perspective. In one example, a unified DCI format with same common RNTI can be used for indicating GTS and WUS and/or activation and deactivation of DRX mode. As transmission occasions of WUS and GTS are mutually exclusive, explicit indication of whether the DCI is sent for GTS or WUS may not be needed. For example, when the UE is in active state and monitoring scheduling DCI, it can only receive GTS. Similarly, when the UE is in DRX mode and turns ON from sleep state, it can only receive WUS.

Based on which state a UE is currently in, different bit fields inside a UE-specific field in a GC DCI can have different interpretations. For example, in regard to a field to indicate activation and deactivation of DRX mode, if received during active state while monitoring PDCCHs or scheduling DCI: the bit field=0 may imply activation, 1 may imply deactivation of DRX mode, vice versa, and if received during WUS monitoring duration: the bit field=0 may imply stay in activated DRX mode, 1 may imply deactivation of DRX mode, vice versa. In regard to a field to indicate offset to start of sleep or ON duration, if received during active state while monitoring PDCCHs or scheduling DCI, the field can indicate an offset to start of sleep duration, and if received during WUS monitoring duration the field can indicate an offset to start of following ON duration for PDCCH monitoring. In regard to a field to indicate duration of following sleep or ON duration, if received during an active state while monitoring PDCCHs or scheduling DCI, the field may indicate sleep duration. The indicated sleep duration can span less or more than a DRX cycle. If received during a WUS monitoring duration, the field can indicate an ON duration for PDCCH monitoring. The indicated sleep duration can span less or more than a DRX cycle. In regard to a field to indicate a bandwidth part ID, if received during an active state while monitoring PDCCHs or scheduling DCI, the field can indicate the bandwidth part where UE turns ON in subsequent occasion. If received during WUS monitoring duration, the field can indicate the bandwidth part where UE wakes up and monitor scheduling DCI.

As described above, WUS and GTS can be signaled via the same DCI, e.g., the same DCI format can be used. In some implementations, the group-common DCI format 2_x transmitted on a PDCCH has a CRC that is scrambled by a configured RNTI, such as a PS-RNTI. Format 2_x can be used to signal wake-up information and go-to-sleep/skip PDCCH monitoring information for a given UE, among a group of UEs that monitor the common DCI format, as shown in FIG. 14. When a UE receives the DCI format 2_x outside active time, the UE would assume the bits in the UE-specific field/block would at least indicate whether the UE needs to wake-up or not. On the contrary, when the UE receives the DCI format 2_x during DRX active time, UE would assume the bits in the UE-specific field would at least indicate whether UE could skip PDCCH monitoring for a given/indicated duration/number of PDCCH occasions.

In some implementations, each UE-specific field has 1 bit. In one option, if the UE is outside of active time and '0' is bit value in the field, UE does not wake up and skip the next N=>1 DRX cycles (e.g., N can be 1). If the UE is outside of active time and '1' is bit value in the field, UE wakes up and transitions to active time or start monitoring for PDCCHs/scheduling DCIs. Vice versa is also possible, e.g., '1' bit value indicates no wake-up and '0' indicates wake-up. In another option, if the UE is within active time and '0' is bit value in the field, UE continues PDCCH monitoring and does not go to sleep. If the UE is within active time and '1' is bit value in the field, UE goes to sleep or skips PDCCH monitoring for a given/configured/specified duration (e.g., duration can be measured in number of slots, K=>1) or for a given/configured/specified number of PDCCH monitoring occasions, M=>1. The duration or number of monitoring occasions that UE skips after receiving this signal can be UE-specifically configured by RRC signaling. Alternatively, upon receiving '1' in the field during active time, UE may go to sleep until the next DRX cycle, e.g., transition from active time to outside of active time and stop drx-inactivity or ON duration timer if running. Vice versa is also possible, e.g., if '0' is received during active time, UE goes to sleep and if '1' is received during active time, UE continues PDCCH monitoring and stays in active time.

In another example, each UE-specific field/block may have N=>1 bits. The field/block of N bits may map to a different set of parameter indications depending on whether the DCI format is received outside or during active time. The mapping of bit values to a set of parameters or configuration when DCI format is received outside active time and during active time can be UE-specifically configured, e.g., by RRC signaling. When the UE receives the DCI format outside active time, the bits in UE-specific field may map to a set of parameters which can include one or more of the following: wake-up indication, e.g., whether UE transitions from outside active time to active time; cross-slot scheduling configuration; trigger for RS such as CSI-RS or TRS; indication of UL resource for CSI reporting; activation or deactivation of carriers or cells; trigger for BWP switching or adaptation; MIMO layer or number of antenna adaptation indication of a CORESET, search space, or both for subsequent PDCCH decoding; indication of DRX configuration and/or one or more of DRX configuration parameters; and indication of number of DRX cycles to be skipped or active. In some implementations, a cross-slot scheduling configuration can include an indication of a Time Domain Resource Allocation (TDRA) table from a set of configured TDRA tables where the indicated TDRA table can enable or disable cross-slot scheduling. In some implementations, a cross-slot scheduling configuration can include an indication of a minimum value of K0, which refers to duration between PDCCH and PDSCH in number of slots. If K0>0, it refers to cross-slot scheduling, i.e., PDSCH and PDCCH are received in different slots.

In some implementations, one or more of the indicated parameters can be in effect when the UE transitions from outside active time to active time, after receiving a wake-up indication. When the UE receives a DCI transmission during active time, the bits in UE-specific field in the DCI may map to a set of parameters which can include one or more of the following: a GTS indication, e.g., whether UE skips PDCCH monitoring or transitions from active time to outside active time; PDCCH skipping duration, e.g., number of slots UE skips PDCCH monitoring; number of PDCCH monitoring occasions to be skipped; and activation or deactivation information for one or more carriers or cells.

The parameters indicated can be signaled in one or more sub-fields in the UE-specific block. For example, a table can be constructed where each row maps to a set of parameters, such as one or more of the above, with certain values, and the UE-specific field/block may indicate a row index of the table. For example, the UE may be configured with two tables, one table is to be used when the UE receives the DCI outside active time, and the other table is to be used when the UE receives the DCI during active time. The table(s) can be configured by UE-specific RRC signaling. In another example, a UE-specific block may have K=>1 sub-fields to indicate M=>1 parameters. M=>K M and K being integers.

In some implementations, each UE-specific field has N=2 bits. When the UE receives the DCI format outside an active time, examples are given in Tables 5 and 6, where 2 bits are shown to map to a certain configuration or set of parameters or the bit value of the field indicates a row index of a configured table.

TABLE 5

| Bit value | Indication |
| --- | --- |
| 00 | UE does not wake-up, e.g., not transition from outside active time to active time |
| 01 | UE transitions from outside active time to active time and follows Cross-slot scheduling configuration A for active time |
| 10 | UE transitions from outside active time to active time and switches to BWP $B_1$, where $B_1$ is a different BWP than the BWP where the DCI format is received |
| 11 | UE transitions from outside active time to active time and follows MIMO layer/number of antenna configuration B |

TABLE 6

| Bit value | Indication |
| --- | --- |
| 00 | UE does not wake-up, e.g.. not transition from outside active time to active time |
| 01 | UE transitions from outside active time to active time and follows a first set of configurations, including one or more of cross-slot scheduling configuration, trigger for RS, BWP, carrier(s), SCell(s), MIMO layers, or number of antennas |
| 10 | UE transitions from outside active time to active time and follows a second set of configurations, including one or more of cross-slot scheduling configuration, trigger for RS, BWP, carrier(s), SCell(s), MIMO layers, or number of antennas |

TABLE 6-continued

| Bit value | Indication |
| --- | --- |
| 11 | UE transitions from outside active time to active time and follows a third set of configurations, including one or more of one or more of cross-slot scheduling configuration, trigger for RS, BWP, carrier(s), SCell(s), MIMO layers, or number of antennas |

In some implementations, configuration such as the one provided in Table 7 is used. When the UE receives the DCI message during an active time, two bits are shown in Table 7 to map to a certain configuration or set of parameters or the bit value of the field indicates a row index of a configured table.

TABLE 7

| Bit value | Indication |
| --- | --- |
| 00 | UE does not go-to-sleep, e.g., not transition from active time to outside active time or skip PDCCH monitoring |
| 01 | UE transitions from active time to outside active time |
| 10 | UE skips PDCCH monitoring for L1 => 1 slots or number of monitoring occasions |
| 11 | UE skips PDCCH monitoring for L2 > L1 slots or number of monitoring occasions |

In some implementations, a DRX configuration is not indicated explicitly, but is implied based on other signaling. For example, a UE can be configured to identify a DRX configuration based on an indicated bandwidth part, if the DRX configuration has been associated with the indicated bandwidth part.

Figure 16:
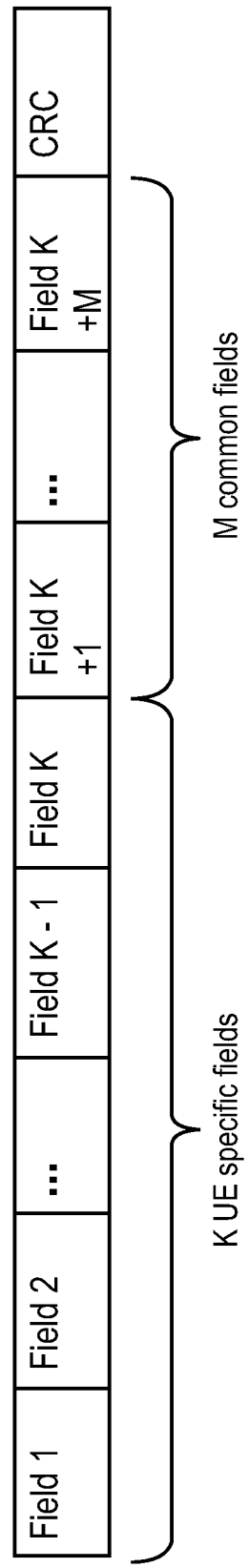
FIG. 16 illustrates an example of a structure of a group-common DCI format that includes UE-specific and common fields.

FIG. 16 illustrates an example of a structure of a group-common DCI format that includes UE-specific and common fields. In this example, the DCI format can include K UE-specific fields and M common fields. Each UE that is configured to monitor the DCI format can obtain control information from respective UE-specific field and M common fields. The DCI format can include a CRC. This and other DCI formats can include one or more reserved bit fields. In some implementations, if the GC DCI is used for GTS, there can be one or more common fields which can be used to indicate one or more of the following: offset to start position of sleep duration, sleep duration, or both. This implies UEs that received GTS trigger as TRUE may have the same sleep duration. This may be useful to indicate in a common manner if there is correlation among the traffic arrival pattern of the group of UEs that monitor the GC-DCI. In some implementations, in the context of a GC DCI for WUS, one or more common fields can be used to indicate at least the ON duration for PDCCH monitoring following the detection of WUS DCI.

Figure 17:
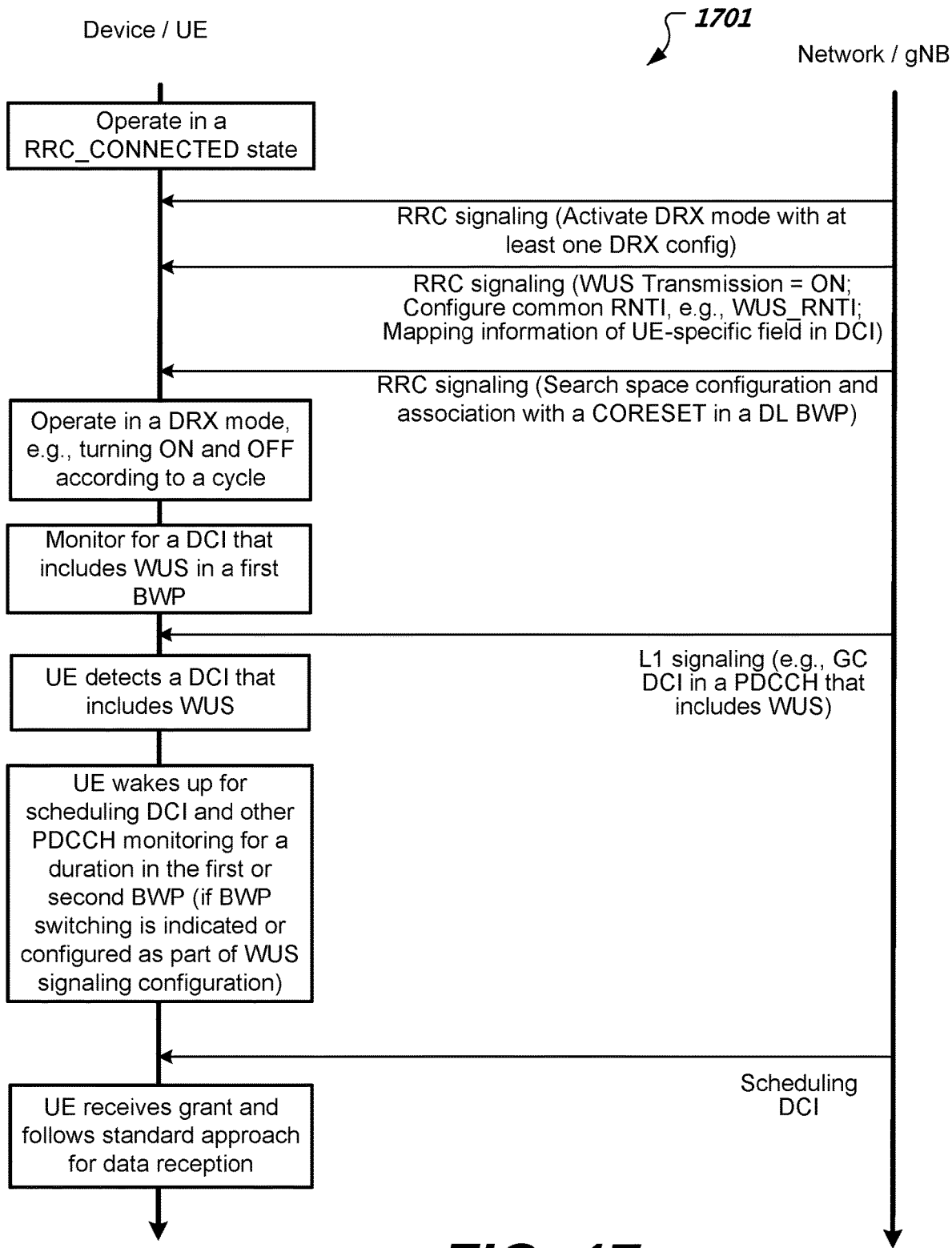
FIG. 17 illustrates a flowchart of an example of a process involving network signaling and UE behaviors before and after detection of DCI that includes a WUS.

FIG. 17 illustrates a flowchart of an example of a process 1701 involving network signaling and UE behaviors before and after detection of a DCI including WUS. In this example, the UE is configured to monitor for a common DCI that includes a WUS. After the RRC_CONNECTED state is established. UE receives one or more RRC signaling communications from the gNB that provides information regarding DRX configuration. The RRC signaling can include signaling for monitoring WUS DCI, other signaling for DCI configuration, or a search space association. Upon detection of a WUS DCI, the UE wakes up in a subsequent duration for PDCCH monitoring, e.g., monitoring for a scheduling DCI, and continues according to a configured DRX mode. In some implementations, the WUS DCI indicates to switch to a different BWP.

UE can be configured to monitor the GC DCI format for signals such as GTS or WUS in one or more common search spaces (e.g., search space set), each common search space associated with a CORESET in the active DL bandwidth part. As part of the search space set configuration, UE may obtain one or more of the following: higher layer RNTI monitoring parameter to notify the UE to monitor for a DCI format with DRX RNTI in the search space set in a given CORESET; PDCCH monitoring periodicity, e.g., K=>1 symbols/slots: PDCCH monitoring offset, e.g. M=>0 symbols/slots, where M can be less than or equal to K; PDCCH monitoring pattern, e.g., one or more initial symbols of CORESETs within a slot or a group of symbols; and PDCCH candidates per aggregation level. Note that DRX RNTI is used as the name of the RNTI for the GC DCI format, however, this is an example only and in principle, any name for the RNTI can be used.

In some implementations, although same search space set may be used to monitor for WUS and GTS DCI, higher layer configuration may be provided for separate DCI format configuration such as GTS DCI may be monitored with multiple aggregation levels, whereas WUS DCI may be monitored with one aggregation level only, to reduce complexity and increase power saving when the UE is operating in DRX mode. Furthermore, monitoring periodicity can be different for GTS DCI and WUS DCI. For example, during the WUS monitoring window which can be quite short, there can be more than one monitoring occasion for WUS so that UE does not miss WUS. For example, once the UE detects WUS, it may not monitor in subsequent occasions for WUS. In some implementations, DCI payload size may be configured by higher layers via MSI, RMSI, OSI or RRC signaling. In some implementations, WUS or GTS may be repeated multiple times so that WUS or GTS detection is achieved with high reliability. The repetition factor can be higher layer configured, in a UE-specific or cell specific or group-specific manner.

The network can transmit DCIS in a code multiplexed sequences in some implementations. Instead of appending the DCI format with CRC scrambled by an RNTI, control information can be transmitted in a sequence without CRC. Sequences with UE-specific control information can be code-multiplexed over a common time-frequency resource. A group of UEs can monitor for respective sequences in the common time-frequency resource. The UE-specific sequences can be multiplexed and transmitted in a common time-frequency resource.

Figure 18:
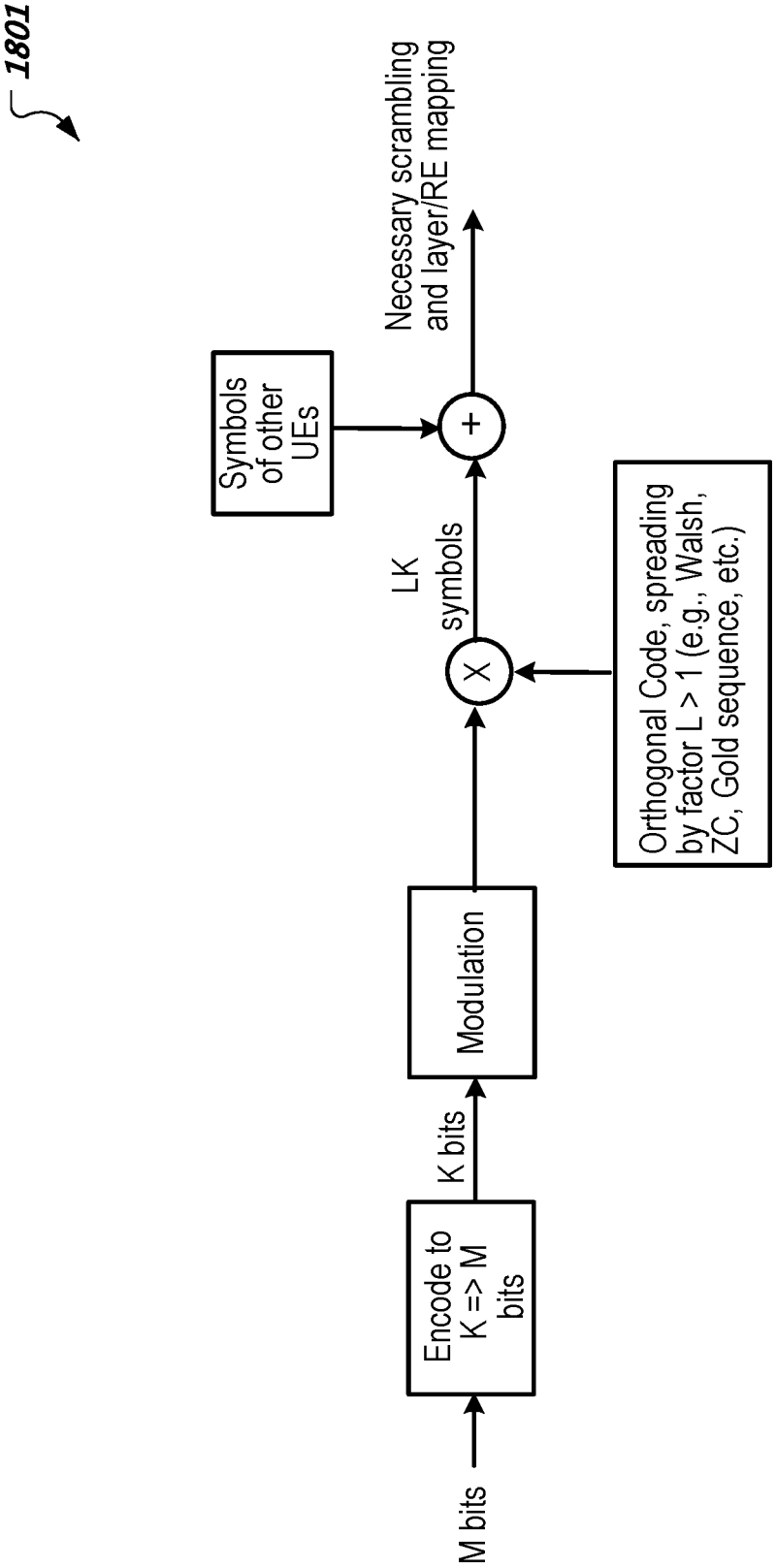
FIG. 18 illustrates a block diagram of an example of using code multiplexed sequences to transmit control information.

FIG. 18 illustrates a block diagram of an example of using code multiplexed sequences to transmit control information. In this example, a block diagram of a structure 1801 is depicted of mapping UE-specific control information to an encoded, modulated, and spreaded sequence which is multiplexed with symbols of other UEs, and then composite multiplexed signal of a group of UEs is mapped to a common set of REs after scrambling, layer processing, and other steps. In this example, M=>1 bits of control information payload of a UE is encoded into K bits. Repetition coding can be applied where K can be a multiple of M. The encoded bits are then modulated (e.g., BPSK, QPSK, etc.) and subsequently spread by an L-point sequence to produce LK symbols. The sequence can be UE-specific and configured by a higher layer. In one example, the sequence can be obtained based on a C-RNTI. Examples of sequences can include a Walsh sequence, Zadoff-Chu sequence, Gold sequence, etc. Finally, LK symbols of this and other UEs are multiplexed and then mapped to a common set of REs after further processing, e.g., layer mapping and scrambling.

In Table 8, length four spreading sequence examples are shown for a normal CP. In one example, each UE is indicated an index from the set, and different UEs monitoring for the sequence in a common resource set are indicated by different indices by the network.

TABLE 8

| Seq index | Normal CP | | | |
|---|---|---|---|---|
| 0 | +1 | +1 | +1 | +1 |
| 1 | +1 | −1 | +1 | −1 |
| 2 | +1 | +1 | −1 | −1 |
| 3 | +1 | −1 | −1 | +1 |
| 4 | +j | +j | +j | +j |
| 5 | +j | −j | +j | −j |
| 6 | +j | +j | −j | −j |
| 7 | +j | −j | −j | +j |

The examples considered above for UE-specific content conveyed in a GC DCI are applicable here as well, e.g., M bits of control information payload can be used to indicate a GTS or WUS trigger, adapt DRX parameters, or switch DRX configurations.

Figure 19A:
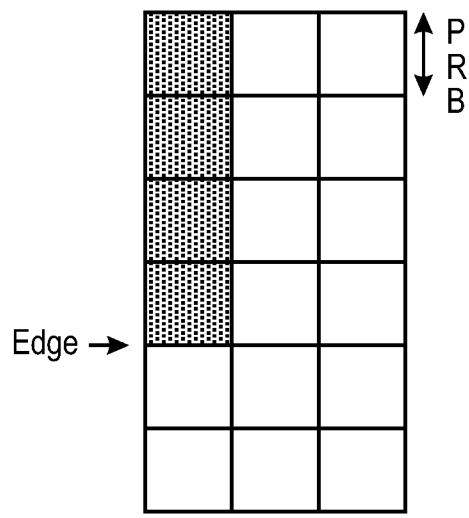
FIGS. 19A, 19B, and 19C illustrate different examples of resource set mappings.
Figure 19B:
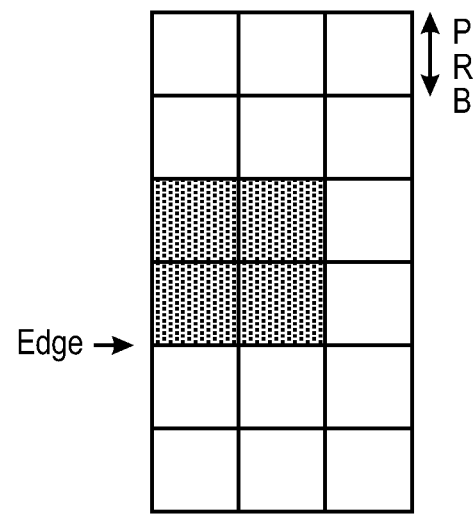
Figure 19C:
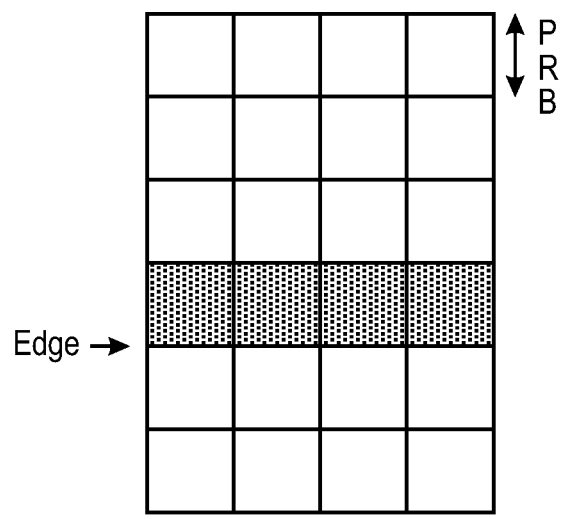

FIGS. 19A, 19B, and 19C illustrate different examples of resource set mappings. A resource set where the multiplexed sequence containing UE-specific control information of K UEs is shown to be mapped to 4 PRBs in 1 symbol (OS) in FIG. 19A. The set is mapped to 2 PRBs in 2 OSs in FIG. 19B. Finally, the set can be mapped to 1 PRB in 4 OSs as shown in FIG. 19C.

In each resource set, there can be one or more search spaces configured to detect the sequence. As part of the search space configuration, UE may obtain one or more of the following related to the DCI format: association between search space with a resource set; aggregation levels; monitoring periodicity, e.g., K=>1 symbols/slots; monitoring offset, e.g., M symbols/slots, where e.g., M can be 0<=M<K; and monitoring pattern, e.g., first symbol(s) of one or more resource sets within a slot. In some implementations, search space for monitoring the DCI format based on a sequence can be monitored with just one aggregation level such as 2, 4, 8, or 16 to reduce complexity.

In some implementations, the resource set can be one of the CORESETs configured in the active DL BWP and the search space can be one of the common search spaces associated with a CORESET. Hence, as part of the common search space configuration, network may notify UE to monitor for DCI format based on sequence that is not appended with any RNTI in the search space. In other words, as part of search space configuration, UE will be notified to monitor a sequence-based DCI format in the search space with given aggregation level(s). In some implementations, a WUS can be a sequence based DCI without RNTI, and a GTS in a DCI can be a PDCCH with RNTI. This may be helpful to ensure low complexity WUS detection.

In some implementations, if a resource set is different from a CORESET, the location of the resource can be implicitly obtained from a configuration of other resources, such as resource used for SSB or a given CORESET. In some implementations, there can be at least one CORESET configured within a DL BWP and frequency domain location of the resource set for monitoring DCI format in a sequence can be obtained as an offset to the location of a given CORESET. For example, the start physical resource block (PRB) of the resource set can be obtained as an offset from the edge PRB of the CORESET. In FIGS. 19A-C, an offset of 0 is considered. Other parameters of the configuration of resource set can be configured via a higher layer. In some implementations, the sequence can be mapped to one or more resource sets with or without repetition. The repetition factor can be higher layer configured, such as UE-specific or group-based RRC signaling. In some implementations, the resource set used for transmitting a sequence based DCI for GTS can be avoided for PDSCH scheduling, e.g., PDSCH can be rate matched around the resource set.

A reduction in unneeded PDCCH monitoring for some parameters as described above can improve UE power consumption by dynamic DRX mode management. One or more signaling mechanisms can be used to activate or deactivate some other parameters to improve UE power consumption with or without an active DRX mode operation in place. In particular, for one or more of the DCI signaling implementations described above, one or more of the following parameters can be included in a UE-specific field an activation or deactivation of secondary carriers (e.g., K=>1 bit field can be used to indicate the carrier ID) and an activation or deactivation of a set of UE antennas. In some implementations, a bit field of L=>1 length can be used to indicate indices or set of indices of UE antennas, RF chains, or both. The network and UE can exchange UE antenna configuration and corresponding indices of the UE antennas prior to signaling for activation or deactivation. In some implementations, MAC CE signaling can be used instead of DCI based signaling to activate or deactivate the parameters.

Figure 20:
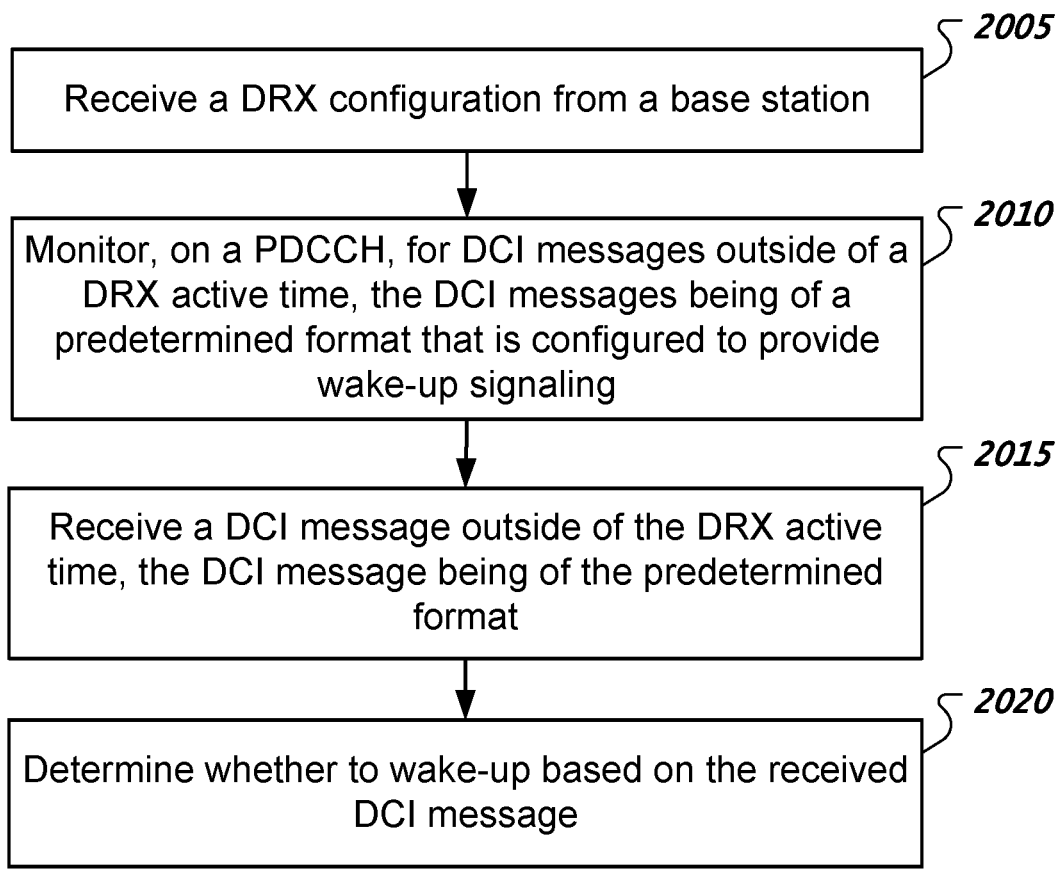
FIG. 20 illustrates an example of a DRX-related process.

FIG. 20 illustrates an example of a DRX-related process. At 2005, the UE receives a DRX configuration from a base station. At 2010, the UE monitors, on a PDCCH, for DCI messages outside of a DRX active time, the DCI messages being of a predetermined format that is configured to provide wake-up signaling. At 2015, the UE receives a DCI message outside of the DRX active time, the DCI message being of the predetermined format. At 2020, the UE determines whether to wake-up based on the received DCI message.

A UE power control technique can include signaling WUS information or GTS information for a UE on a PDCCH using a group-common DCI format. In some implementations, the UE is one of a plurality of UEs, and each UE is configured to monitor the group-common DCI format. In some implementations, the group-common DCI format includes a UE-specific field that indicates whether the UE is to wake up. The technique can include determining, when the group-common DCI format is received outside a DRX active time, whether the UE is to wake. The technique can include determining, when the group-common DCI format is received during a DRX active time, whether the UE can skip PDCCH monitoring for a predetermined number of occasions.

A technique for managing wake-up and go-to-sleep states by a UE can include remaining in a sleep state, when a group-common DCI message is received outside a DRX active time and indicates no wake-up, and skipping a predetermined number of DRX cycles; and waking from a sleep state, when the group-common DCI message is received outside the DRX active time and indicates a wake-up, and transitioning to active time. Technique can include monitoring PDCCH, when the group-common DCI message is received during the DRX active time and indicates wake-up; and sleeping or skipping PDCCH monitoring for a predetermined duration, when the group-common DCI message is received during the DRX active time and indicates go-to-sleep. The technique can include sleeping, when the group-common DCI message is received during the DRX active time and indicates go-to-sleep, until a next DRX cycle.

In some implementations, when the UE receives a group-common DCI message outside the DRX active time, the DCI message includes UE-specific bits that map to one or more of: a wake-up indication, e.g., whether UE transitions from outside active time to active time; a cross-slot scheduling configuration; a trigger for RS such as CSI-RS, TRS; indication of UL resource for CSI reporting; activation or deactivation of carriers or cells: trigger for MVP switching/adaptation: MIMO layer or number of antenna adaptation; indication of CORESET/search space; candidate of subsequent PDCCH decoding; indication of DRX configuration and/or one or more of DRX configuration parameters; or indication of number of DRX cycles to be skipped or active. A cross-slot scheduling configuration can include an indication of a TDRA table from a set of configured TDRA tables where the indicated TDRA table may enable or disable cross-slot scheduling. In some implementations, a cross-slot scheduling configuration can include an indication of a minimum value of K0, which refers to duration between PDCCH and PDSCH in number of slots. If K0>0, it refers to cross-slot scheduling, i.e., PDSCH and PDCCH are received in different slots.

In some implementations, when the UE receives the group-common DCI message during the DRX active time, the DCI message includes UE-specific bits that map to one or more of: Go-to-sleep indication, e.g., whether UE skips PDCCH monitoring or transitions from active time to outside active time; a PDCCH skipping duration, e.g., number of slots UE skips PDCCH monitoring; number of PDCCH monitoring occasions to be skipped; and activation or deactivation of carriers or cells.

These and other techniques can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. Examples of processors can include Apple A-series processors, Intel® Architecture Core™ processors, ARM processors, AMD processors, and Qualcomm processors. Other types of processors are possible. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. Circuitry can also include radio circuitry such as a transmitter, receiver, or a transceiver.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving a configuration message that indicates a wake-up configuration associated with a configured discontinuous reception (DRX) operation between a user equipment (UE) and a base station,
      wherein the configuration message is received via radio resource control (RRC) signaling,
      wherein the configuration message comprises an offset parameter that specifies an offset relative to a start of a following on duration time associated with the configured DRX operation,
      wherein the configuration message includes a payload size for a downlink control information (DCI) message containing a wake-up signal, and
      wherein a DRX configuration provides information on one or more search space sets in which to monitor for the DCI message;
   determining, based at least on the wake-up configuration, for wake-up signal monitoring, a bandwidth part (BWP) to monitor and a time period to monitor, wherein the time period occurs during a period configured to be an off-time based at least on the configured DRX operation;
   monitoring for the wake-up signal within the BWP and the time period, wherein the wake-up signal indicates whether the UE is to be on or off for a next on-time of the configured DRX operation, and wherein monitoring for the wake-up signal comprises:
      receiving, via a physical downlink control channel (PDCCH), the DCI message, and
      detecting the wake-up signal within the DCI message; and
   determining, based at least on the monitoring, whether to be on for the next on-time.

2. The method of claim 1, wherein the DCI message is associated with a group-common DCI format, and wherein the UE is one of a plurality of UEs, and each of the plurality of UEs is configured to monitor for the group-common DCI format, and wherein the group-common DCI format comprises a UE-specific field that indicates whether the UE is to wake up.

3. The method of claim 2, comprising:
   waking from a sleep state and transitioning to an active state for the next on-time based at least on the DCI message indicating a wake-up for the UE; or
   remaining in the sleep state and skipping the next on-time based at least on the DCI message not indicating a wake-up for the UE.

4. The method of claim 2, wherein the group-common DCI format includes one or more UE-specific bits that map to one or more of: a wake-up indication, cross-slot scheduling configuration, trigger for a reference signal, indication of an uplink resource for channel state report, activation of a cell, deactivation of a cell, activation of a carrier, deactivation of a carrier, trigger for BWP switching, PDCCH decoding information, DRX configuration, or an indication of a number of DRX cycles to be skipped or active.

5. The method of claim 1, comprising:
   monitoring for one or more additional DCI messages during the next on-time, the additional DCI messages being of a predetermined format that is configured to provide go-to-sleep signaling and comprises one or more UE-specific bits that map to one or more of: a go-to-sleep indication to control whether the UE skips PDCCH monitoring or transitions from active time to outside active time, a number of PDCCH monitoring occasions to be skipped, a PDCCH skipping duration, activation of a cell, deactivation of a cell, activation of a carrier, or deactivation of a carrier.

6. An apparatus comprising:
   one or more processors;
   circuitry to communicate between a user equipment (UE) and a base station;
   a memory storing instructions that, when executed by the one or more processors, cause the one or more processors to perform operations comprising:
      receiving, via the circuitry, a configuration message that indicates a wake-up configuration associated with a configured discontinuous reception (DRX) operation between the UE and the base station,
         wherein the configuration message is received via radio resource control (RRC) signaling,
         wherein the configuration message comprises an offset parameter that specifies an offset relative to a start of a following on duration time associated with the configured DRX operation,
         wherein the configuration message includes a payload size for a downlink control information (DCI) message containing a wake-up signal, and
         wherein a DRX configuration provides information on one or more search space sets in which to monitor for the DCI message;
      determining, based at least on the wake-up configuration, for wake-up signal monitoring, a bandwidth part (BWP) to monitor and a time period to monitor, wherein the time period occurs during a period configured to be an off-time based at least on the configured DRX operation;

monitoring, via the circuitry, for a wake-up signal within the BWP and the time period, wherein the wake-up signal indicates whether the UE is to be on or off for a next on-time of the configured DRX operation, and wherein monitoring for the wake-up signal comprises:

receiving, via a physical downlink control channel (PDCCH), the DCI message, and detecting the wake-up signal within the DCI message; and determining, based at least on the monitoring, whether to be on for the next on-time.

7. The apparatus of claim 6, wherein the BWP is a first BWP, wherein the next on-time is associated with a second BWP, and wherein the configuration message comprises an indication for BWP switching.

8. The apparatus of claim 6, wherein determining, based at least on the monitoring, whether to be on for the next on-time comprises determining, based at least on the DCI message, whether the UE is permitted to skip monitoring for a subsequent wake-up signal for a predetermined number of occasions.

9. The apparatus of claim 6, wherein the DCI message is associated with a group-common DCI format, and wherein the UE is one of a plurality of UEs, and each of the plurality of UEs is configured to monitor for the group-common DCI format, and wherein the group-common DCI format comprises a UE-specific field that indicates whether the UE is to wake up.

10. The apparatus of claim 9, comprising:

waking from a sleep state and transitioning to an active state for the next on-time based at least on the DCI message indicating a wake-up for the UE; or remaining in the sleep state and skipping the next on-time based at least on the DCI message not indicating a wake-up for the UE.

11. The apparatus of claim 9, wherein the group-common DCI format includes one or more UE-specific bits that map to one or more of: a wake-up indication, cross-slot scheduling configuration, trigger for a reference signal, indication of an uplink resource for channel state report, activation of a cell, deactivation of a cell, activation of a carrier, deactivation of a carrier, trigger for BWP switching, PDCCH decoding information, DRX configuration, or an indication of a number of DRX cycles to be skipped or active.

12. The apparatus of claim 9, comprising:

monitoring for one or more additional DCI messages during the next on-time, the additional DCI messages being of a predetermined format that is configured to provide go-to-sleep signaling and comprises one or more UE-specific bits that map to one or more of: a go-to-sleep indication to control whether the UE skips PDCCH monitoring or transitions from active time to outside active time, a number of PDCCH monitoring occasions to be skipped, a PDCCH skipping duration, activation of a cell, deactivation of a cell, activation of a carrier, or deactivation of a carrier.

13. An apparatus comprising:

one or more processors;

circuitry to communicate with a user equipment (UE); and a memory storing instructions that, when executed by the one or more processors, cause the one or more processors to perform operations comprising:

transmitting, via the circuitry, a configuration message that indicates a wake-up configuration associated with a configured discontinuous reception (DRX) operation between the UE and a base station, wherein the configuration message provides information regarding a bandwidth part (BWP) and a time period to monitor, wherein the time period occurs during a period configured to be an off-time based at least on the configured DRX operation, wherein the configuration message is transmitted via radio resource control (RRC) signaling, wherein the configuration message comprises an offset parameter that specifies an offset relative to a start of a following on duration time associated with the configured DRX operation, wherein the configuration message includes a payload size for a downlink control information (DCI) message containing a wake-up signal, and wherein a DRX configuration provides information on one or more search space sets in which to monitor for the DCI message; and transmitting, via the circuitry via a physical downlink control channel (PDCCH) the DCI message including the a wake-up signal within the BWP and the time period, wherein the wake-up signal indicates whether the UE is to be on or off for a next on-time of the configured DRX operation.

14. The apparatus of claim 13, wherein the DCI message is associated with a group-common DCI format, and wherein the UE is one of a plurality of UEs, and each of the plurality of UEs is configured to monitor for the group-common DCI format, and wherein the group-common DCI format comprises a UE-specific field that indicates whether the UE is to wake up.

* * * * *